(12) United States Patent
Maeda

(10) Patent No.: US 7,378,182 B2
(45) Date of Patent: May 27, 2008

(54) CYLINDRICAL ALKALINE STORAGE BATTERY

(75) Inventor: Taishi Maeda, Takasaki (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 566 days.

(21) Appl. No.: 10/909,312

(22) Filed: Aug. 3, 2004

(65) Prior Publication Data

US 2005/0031948 A1 Feb. 10, 2005

(30) Foreign Application Priority Data

Aug. 4, 2003 (JP) .............................. 2003-286329

(51) Int. Cl.
*H01M 2/00* (2006.01)
*H01M 2/26* (2006.01)
*H01M 4/72* (2006.01)

(52) U.S. Cl. .................... 429/94; 429/164; 429/211

(58) Field of Classification Search .................. 429/94, 429/161, 164, 211, 223, 241
See application file for complete search history.

(56) References Cited

U.S. PATENT DOCUMENTS

| | | | |
|---|---|---|---|
| 6,887,618 B2 * | 5/2005 | Shelekhin et al. | 429/175 |
| 6,991,872 B2 * | 1/2006 | Yoppolo et al. | 429/56 |
| 2003/0077509 A1 * | 4/2003 | Probst et al. | 429/162 |
| 2003/0148178 A1 * | 8/2003 | Kaneta | 429/162 |

FOREIGN PATENT DOCUMENTS

| | | |
|---|---|---|
| JP | 2-50964 | 4/1990 |
| JP | 03-116654 | 5/1991 |
| JP | 03-274676 | 12/1991 |
| JP | 05-190158 | 7/1993 |
| JP | 08-222266 | 8/1996 |
| JP | 10-199520 | 7/1998 |
| JP | 11-329480 | 11/1999 |
| JP | 2000-113904 | 4/2000 |
| JP | 2000-357519 | 12/2000 |
| JP | 2001-006723 | 1/2001 |
| JP | 2001-068146 | 3/2001 |
| WO | WO 03/021698 A1 | 3/2003 |

* cited by examiner

*Primary Examiner*—Stephen J. Kalafut
(74) *Attorney, Agent, or Firm*—Westerman, Hattori, Daniels & Adrian, LLP.

(57) ABSTRACT

A cylindrical alkaline storage battery has a conductive cylindrical case whose outside diameter lies in a range from 13.5 mm to 14.5 mm, and an electrode assembly contained, together with an alkaline electrolyte, in the case. The electrode assembly is formed by spirally winding a belt-like negative plate and a belt-like positive plate with a separator intervened therebetween. The negative plate forms the outermost portion of the electrode assembly which contacts the inner wall of the case. The volume energy density of the battery lies in a range from 340 Wh/l to 450 Wh/l. The ratio of the volume of the positive plate to the characteristic volume of the case is in a range from 48% to 60%.

18 Claims, 13 Drawing Sheets

CYLINDRICAL ALKALINE STORAGE BATTERY

This nonprovisional application claims priority under 35 U.S.C. §119(a) on Patent Application No. 2003-286329 filed in Japan on Aug. 4, 2003, the entire contents of which are hereby incorporated by reference.

BACKGROUND OF THE INVENTION

1. Field of the Invention

The present invention relates to a cylindrical alkaline storage battery suitable for achieving a high capacity.

2. Description of the Related Art

Alkaline batteries available include, for example, a nickel cadmium secondary battery and a nickel hydrogen secondary battery depending on the types of active materials contained in the batteries. Some of those alkaline batteries are of a cylindrical type which has a cylindrical case. The case is sealed with a lid having a relief valve and accommodates an electrode assembly together with an alkaline electrolyte. The electrode assembly is formed by winding a belt-like negative plate and a belt-like positive plate spirally with a separator in between and are contained in the case while that part of the negative plate which is wound around the outermost one of the electrode assembly contacts the inner wall of the case.

The positive plate, which is called a nickel electrode, is formed by filling a positive mixture in a nickel substrate having a three-dimensional mesh structure. The positive mixture includes nickel hydroxide particles as a positive active material, additive particles and a binder which binds those particles. The negative plate is formed by covering both sides of a metal sheet as a negative substrate with a hydrogen absorbing alloy layer as a negative active material layer. The metal sheet has through holes in which the negative active material is filled. The hydrogen absorbing alloy layer is comprised of hydrogen absorbing alloy particles which can absorb and desorb hydrogen as a negative active material, and a binder which binds the hydrogen absorbing alloy particles. While the capacity of each of the positive plate and the negative plate is defined by the amount of the active material or the amount of the hydrogen absorbing alloy contained therein, the battery capacity is defined by the capacity of the positive electrode. This is because the capacity of the negative electrode in this type of cylindrical alkaline storage battery is set greater than the capacity of the positive electrode in order to prevent the inner pressure from rising by reducing an oxygen gas produced in the positive plate with the negative plate when the battery is overcharged.

Recently has been increasing the demand for cylindrical alkaline storage batteries of this type, particularly, cylindrical alkaline storage batteries of AA size compatible with AA-size dry cells, as electronic and electric devices, such as a digital camera, which use the batteries as power supplies become popular. A cylindrical alkaline storage battery of AA size is strongly demanded of higher capacity or an improvement on the volume energy density in order to enable continuous use of the devices for extended time. To increase the battery capacity, the capacity of the positive electrode that defines the battery capacity should be increased. Specifically, the amount of the positive active material should be increased or the ratio of usage of the positive active material should be improved. To increase the amount of the positive active material, it is known to increase the length, thickness and area of the positive plate and the filling density of the positive mixture in the positive substrate. In case of increasing the thickness of the positive plate or enhancing the filling density of the positive mixture in the positive substrate, it is unnecessary to make the separator and the negative plate longer, thus ensuring an efficient increase in the amount of the positive active material. For example, Japanese Patent Laid-Open Publication No. Hei 10-199520 discloses a cylindrical alkaline storage battery which achieves a high capacity by setting the thickness of a nickel electrode equal to or greater than 0.8 mm.

The following problems would however occur when the cylindrical alkaline storage battery described in the publication is adapted to an AA-size cylindrical alkaline storage battery whose case has an outside diameter of 13.5 mm to as large as 14.5 mm and whose positive plate is made thick enough so that the volume energy density becomes 340 Wh/l or higher.

First, the battery life becomes shorter with an increase in the thickness of the positive plate.

As the thickness of the positive plate increases, the distortion of a spiral shape drawn by the positive plate and the negative plate in view of the lateral cross-sectional area of the electrode assembly increases, making the gap between the positive plate and the negative plate nonuniform in the lengthwise direction of the positive plate and the negative plate. When the thickness of the positive plate becomes 0.95 mm or thicker, particularly, a fluctuation in the gap between both plates becomes greater. As the fluctuation in the gap between both plates becomes greater, an oxygen gas is locally produced when charging, increasing the inner pressure of the battery. This actuates the relief valve so that the alkaline electrolyte leaks out, thus shortening the battery life.

Secondly, when the inner end portion of the negative plate extends over the inner end portion of the positive plate in the circumferential direction of the electrode assembly on the outer surface side of the positive plate, a negative mixture comes off from that portion of the negative plate which extends over the inner end portion of the positive plate, thus decreasing the capacity of the negative electrode.

A clearance is defined in front of the inner end surface of the positive plate in view of the circumferential direction of the electrode assembly by the inner end surface of the positive plate and that portion of the separator which extends from the inner surface and outer surface of the positive plate over the inner end surface of the positive plate. The size of the clearance formed accords with the thickness of the positive plate. In the cylindrical alkaline storage battery which uses electrode assembly having such a clearance, after the initial charge/discharge, that portion of the negative plate which is positioned outside the clearance in the radial direction of the electrode assembly via the separator is bent toward the inner end surface of the positive plate in such a way as to reduce the clearance. When the thickness of the positive plate becomes 0.95 mm or greater, particularly, the bending of the negative plate in front of the inner end surface of the positive plate becomes larger, so that the negative mixture comes off from the bent portion of the negative plate, thus reducing the capacity of the negative electrode.

When the outer end portion of the negative plate extends over the outer end portion of the positive plate in the circumferential direction of the electrode assembly on the outer surface of the positive plate, the negative substrate may be broken at that portion of the negative plate which is overlaid on the outer surface edge of the outer end portion of the positive plate via the separator, thereby increasing the inner resistance, or the negative mixture may come off from that portion, thereby reducing the capacity of the negative electrode.

When the electrode assembly is wound, the portion of the negative plate which is overlaid on the outer surface edge of the outer end portion of the positive plate via the separator is bent. In addition, the outside diameter of the electrode assembly increases at the bent portion of the negative plate, so that the bent portion of the negative plate slides against the electrode winding machine or the case at the time the electrode assembly is wound or are inserted into the case. When the thickness of the positive plate becomes 0.95 mm or greater, particularly, the bending of that portion of the negative plate which is overlaid on the outer surface edge of the outer end portion of the positive plate and sliding of the bent portion of the negative plate against the winding machine or the case becomes intense. Therefore, the negative substrate may be broken at the bent portion of the negative plate, thereby increasing the inner resistance, or the negative mixture may come off from that portion, thereby reducing the capacity of the negative electrode.

Further, when the thickness of the positive plate becomes 0.95 mm or greater, the positive plate is broken and the broken portion breaks through the separator to contact the negative plate at the time the electrode assembly is wound, causing short-circuiting.

When the positive plate is made thick enough so that the volume energy density becomes 340 Wh/l or higher, the volumes of the negative plate, the alkaline electrolyte and the separator decrease and the excess space in the battery excluding those volumes and the volume of the positive plate decreases as well. This would raise the following problems. Before going into the detailed description of the problems, terms are defined as follows.

Capacity ratio: the ratio of the capacity of the entire negative plate to the capacity of the positive electrode Non-overlapping portion: the portion of the negative active material layer which does not overlap the positive plate via the separator Overlapping portion: the portion of the negative active material layer which overlaps the adjoining positive plate via the separator Ratio of the non-opposing portion of the negative plate: the occupying ratio of the amount of the negative active material contained in the non-overlapping portion of the negative active material layer to the total amount of the negative active material Opposing capacity ratio: the ratio of the capacity of the overlapping portion of the active material layer of the negative plate to the capacity of the positive electrode Capacity-electrolyte ratio: the ratio of the volume of the alkaline electrolyte to 0.2 C capacity To begin with, a decrease in the volume of the negative plate or a decrease in the amount of the negative active material reduces the battery life.

As the capacity of the positive electrode is increased by making the positive plate thicker, the capacity ratio decreases, thereby reducing the amount of the negative active material contained in the overlapping portion of the negative active material layer (hydrogen absorbing alloy layer). As the battery reaction mainly progresses between the positive active material and the overlapping portion of the negative active material layer at the time of charge/discharge, the battery reaction does not progress smoothly if the amount of the negative active material contained in the overlapping portion is small.

In a battery with the ratio of the non-opposing portion of the negative plate of 29%, for example, when the capacity ratio drops to 1.4 or lower, the opposing capacity ratio becomes 1.00 or less, so that the capacity of the negative electrode substantially becomes smaller than the capacity of the positive electrode.

When the opposing capacity ratio becomes 1.00 or less, it becomes impossible to exchange protons at the shortest distance at the time the battery reaction occurs. So the reaction is made non-uniform, thereby lowering the discharge characteristics. Further, the time for the oxygen gas that has been produced in the positive plate at the time of charging to pass through the separator, reach the negative plate and be reduced becomes longer, thus increasing the inner pressure of the battery. This actuates the relief valve, so that the alkaline electrolyte leaks out. When charge/discharge is repeated, therefore, the battery life becomes shorter due to two factors: early and local deterioration of the active material caused by the non-uniform reaction and the leakage of the alkaline electrolyte caused by an increase in the inner pressure of the battery.

Secondly, when the amount of the alkaline electrolyte decreases, the capacity-electrolyte ratio decreases. When the capacity-electrolyte ratio becomes 0.85 ml/Ah or less, the amount of the electrolyte becomes short at the portion where the positive plate and the negative plate overlap each other via the separator. This increases the electric resistance, lowering the discharge characteristic.

Because the alkaline electrolyte mainly exist in the form of being contained in the positive plate, the negative plate and the separator in entirety in the battery, some of the alkaline electrolyte is contained in the non-overlapping portion of the negative plate which does not directly contribute to the battery reaction and the separator adjoining to the non-overlapping portion. Accordingly, the amount of the alkaline electrolyte which is contained in the positive plate, the overlapping portion of the negative plate where the battery reaction takes place, and the separator sandwiched therebetween is what is obtained by subtracting the amount of the alkaline electrolyte contained in the non-overlapping portion of the negative plate from the total amount of the alkaline electrolyte. In the case where the capacity-electrolyte ratio becomes 0.85 ml/Ah or less, if a part of the alkaline electrolyte is contained in the non-overlapping portion of the negative plate, the amount of the alkaline electrolyte that is present in the place of the battery reaction becomes short. This increases the electric resistance between the positive plate and the negative plate, thus lowering the discharge characteristic.

When continuous charging takes place at a low temperature, the positive plate is expanded to absorb the electrolyte. In a battery which has a small amount of the electrolyte, therefore, the discharge performance after continuous charging drops, causing a significant voltage drop at the initial discharge stage. This low-temperature continuous charge characteristic also considerably decreases when the capacity-electrolyte ratio becomes 0.85 ml/Ah or less.

When a separator with a small thickness or a light weight per area is used to reduce the volume of the separator, short-circuiting is likely to occur between the positive plate and the negative plate, resulting in lower quality. Short-circuiting is particularly apt to occur at a circumferential position where the outer end portion of the positive plate is positioned. This is originated from the outside diameter of the electrode assembly being maximized at the circumferential position and a burr is present at the edge of the outer end portion of the positive plate. That is, as the outside diameter is the maximum, the outer end portion of the positive plate is compressed by the inner wall of the case from both radial sides. At this time, the burr at the outer end portion of the positive plate is compressed and breaks through the separator, thereby increasing the frequency of occurrence of short-circuiting.

When the excess space is reduced, the space for temporarily storing the oxygen gas produced in the positive plate is gone. When the oxygen gas is produced in the positive plate at the time of charging, therefore, the inner pressure rises immediately to actuate the relief valve, thereby causing the alkaline electrolyte to leak out.

SUMMARY OF THE INVENTION

Accordingly, it is a primary objective of the invention to provide an AA-size cylindrical alkaline storage battery which suppresses reductions in battery life and discharge characteristic and has a high volume energy density.

To achieve the object, according to one aspect of the invention, there is provided a cylindrical alkaline storage battery which comprises a cylindrical case having a conductivity and an outside diameter within a range from 13.5 mm to 14.5 mm; and an electrode assembly contained in the case together with an alkaline electrolyte, the electrode assembly including a belt-like negative plate and a belt-like positive plate, the negative plate and positive plate being spirally wound with a separator intervened therebetween, the negative plate forming an outermost portion of the electrode assembly and being in contact with an inner wall of the case, wherein a volume energy density of the battery ranges from 340 Wh/l to 450 Wh/l, and a ratio of a volume of the positive plate to a characteristic volume of the case ranges from 48% to 60%.

In the battery with the structure, the outside diameter of the case is set in a range from 13.5 mm to 14.5 mm, the ratio of the volume of the positive plate to the characteristic volume of the case is set in a range from 48% to 60%, and the battery has a high volume energy density in a range from 340 Wh/l to 450 Wh/l.

The characteristic volume of the case is defined as a volume of a cylindrical space having an axial length equal to the electrode assembly excluding the separator and a diameter equal to the inside diameter of the case.

The volume of the positive plate is the volume of the positive plate contained in the case and can be acquired as follows. First, the circumferential length of the inner surface of the positive plate in the radial direction of the electrode assembly, which is nearly equivalent to the length of the positive plate before winding, and the thickness of the positive plate in the radial direction of the electrode assembly is measured on the lateral cross-sectional image of the battery taken by an X-ray CT apparatus. Then, the battery is disassembled to remove the positive plate and the removed positive plate is dried, after which the length of the positive plate in the radial direction of the electrode assembly, which is nearly equivalent to the length of the positive plate before winding, is measured using a ruler or the like. Then, the volume of the positive plate is acquired by multiplying the obtained circumferential length of the positive plate in the radial direction of the electrode assembly, the radial thickness of the positive plate and the axial length of the positive plate by one another.

As a preferable mode, the positive plate includes a metal substrate having a three-dimensional mesh-like frame and a positive mixture filled in the substrate, and has a thickness of 0.95 mm or greater.

According to this mode, setting the thickness of the positive plate to 0.95 mm or greater efficiently increases the amount of the positive active material without increasing the lengths of the separator and the negative substrate, thereby achieving a volume energy density of 340 Wh/l or greater.

The thickness of the positive plate is the thickness of the positive plate, contained in the case, in the radial direction of the electrode assembly and is a value measured on the lateral cross-sectional image of the battery taken by an X-ray CT apparatus.

As a preferable mode, the positive plate includes a metal substrate having a three-dimensional mesh-like frame and a positive mixture filled in the substrate at a filling density of 2.95 g/cm$^3$ or higher.

With the structure, setting the filling density of the positive mixture filled in the positive substrate to 2.95 g/cm$^3$ or higher suppresses the expansion of the positive plate originated from absorption of the alkaline electrolyte while charge/discharge is repeated. As a result, the amount of the alkaline electrolyte that contributes to the battery reaction is secured, thereby restraining the battery life from becoming shorter.

As a preferable mode, the positive plate has a thickness equal to or greater than 2.5 times the average thickness of the negative plate.

As the positive plate has a thickness equal to or greater than 2.5 times the average thickness of the negative plate in the mode, the amount of the positive active material is increased efficiently to achieve a volume energy density of 340 Wh/l or higher.

The average thickness of the negative plate is the average thickness of the negative plate obtained by measuring the thickness of the negative plate at plural locations in the lengthwise direction of the negative plate with a micrometer after the battery is disassembled to remove the negative plate and the removed negative plate is dried. When the negative plate has a section with a length of x1 and a thickness of y1 and a section with a length of x2 and a thickness of y2, for example, the average thickness Y of the negative plate is acquired from the following equation.

$$Y=((x1 \times y1)+(x2 \times y2))/(x1+x2)$$

As a preferable mode, the positive plate has a thickness equal to or greater than 9 times the average thickness of the separator.

According to this mode, setting the thickness of the positive plate equal to or greater than 9 times the average thickness of the separator efficiently increases the amount of the positive active material to achieve a volume energy density of 340 Wh/l or higher.

The average thickness of the separator is the average thickness of the separator obtained by measuring the thickness of the separator at plural locations in the lengthwise direction of the separator with a micrometer after the battery is disassembled to remove the separator and the removed separator is dried. When two or more separators with different thicknesses are wound in between the electrodes, the average thickness refers to the average thickness of those separators.

As a preferable mode, the positive plate has an inner end portion and an outer end portion respectively corresponding to the beginning of winding of the electrode assembly and the end of winding thereof, and a main portion which extends between the inner end portion and the outer end portion and has a constant thickness, and at least one of the inner end portion and the outer end portion is thinner than the main portion.

As at least one of the inner end portion and the outer end portion is formed thinner than the main portion (positive main portion) in the structure, the positive plate and the negative plate are wound in a nice spiral form in view of the lateral cross section. Accordingly, the gap between the positive plate and the negative plate becomes uniform in the entire lengthwise direction, thereby suppressing the generation of the oxygen gas originated from local termination of the charge reaction in the positive plate at the time of charging. This structure prevents leakage of the alkaline electrolyte through the actuation of the relief valve, thus suppressing shortening of the battery life. In addition, with the positive plate wound nicely, even if the positive main portion has a thickness of 0.95 mm or greater, the positive main portion is not likely to be broken at the time of winding, thus preventing the occurrence of short-circuiting.

As at least one of the inner end portion and the outer end portion is formed thinner than the positive main portion in the structure, even if the positive main portion has a thickness of 0.95 mm or greater and the inner end portion and the outer end portion of the negative plate extend over the inner end portion and the outer end portion of the positive plate on the outer surface side of the positive plate, a reduction in the capacity of the negative electrode and an increase in inner resistance are prevented.

When the inner end portion of the positive plate is formed thin, the positive plate at the distal end of the inner end portion of the positive plate becomes thin. Accordingly, the clearance defined by the inner end portion of the positive plate and those portions of the separator which extend over the inner end portion of the positive plate from both the inner surface side and the outer surface side of the positive plate becomes smaller in front of the inner end portion of the positive plate in view of the circumferential direction of the electrode assembly. Therefore, even if that portion of the negative plate which is positioned outward of the clearance in the radial direction of the electrode assembly via the separator is bent toward the inner end portion of the positive plate in such a way as to reduce the clearance after the initial charging/discharging of the battery, the bending becomes small. This prevents the negative mixture from coming off from the negative substrate at the bent portion of the negative plate, thereby preventing a reduction in the capacity of the negative electrode.

When the outer end portion of the positive plate is formed thin, on the other hand, the portion of the negative plate which is overlaid on the outer surface of the outer end portion of the positive plate via the separator is bent at the boundary between the positive main portion and the outer end portion of the positive plate rather at the outer surface edge of the end portion of the positive plate. When the negative plate is bent at the boundary of the positive plate, bending of the negative plate becomes smaller, as compared with a case where the negative plate is bent at the outer surface edge of the end portion of the positive plate without forming the end portion of the positive plate thin. Further, the amount of the protrusion of the bent portion of the negative plate outward in the radial direction of the electrode assembly becomes small too, so that sliding of the bent portion of the negative plate with the electrode winding machine and the case is suppressed. This prevents the inner resistance from increasing which would otherwise be caused by the breaking of the negative substrate of the battery at that portion of the negative plate which is overlaid on the boundary of the positive plate via the separator, or prevents the separation of the negative mixture from that portion which would otherwise reduce the capacity.

As a preferable mode, the outer end portion of the positive plate is thinner than the main portion, the positive plate includes an inner surface and an outer surface in view of the radial direction of the electrode assembly, the inner surface having a flat boundary area between the main portion and the outer end portion, and the battery further comprises an insulating protection member located between the outer surface of the positive plate and the separator, the insulating protection member covering the boundary area.

When the electrode assembly is inserted into the case, large depressing pressure is applied to the boundary area between the inner end portion and the outer end portion of the positive plate, which are made thin, and the main portion, in the radial direction (thickness direction). Because the protection member is intervened between the boundary area and the separator positioned outward in the radial direction of the positive plate in the structure, the burr at the boundary area of the outer surface is prevented from breaking through the separator and contacting the negative plate, which would otherwise result in short-circuiting. While depressing pressure in the thickness direction applied to the boundary area of the inner surface is large when the electrode assembly is inserted into the case, the boundary area is level and flat and does not therefore break through the separator to be short-circuited with the negative plate. In the battery, therefore, the contact between the positive plate and the negative plate is prevented on both sides of the positive plate at the inner end portion and the outer end portion of the positive plate, thereby preventing short-circuiting.

As a preferable mode, the positive mixture of the positive plate includes mixed particles containing nickel hydroxide particles as a positive active material and additive particles, the mixed particles having a tap density within a range from 2.1 g/cm$^3$ to 2.3 g/cm$^3$ and a binder for binding the mixed particles.

According to this mode, as the tap density of the mixed particles containing nickel hydroxide particles as a positive active material and additive particles is equal to or greater than 2.1 g/cm$^3$, the density of the positive active material is high and is suitable for increasing the capacity while the occurrence of short-circuiting and a reduction in overcharge characteristic are prevented.

To simplify the description, let us consider a case where two positive plates with the same capacity and the same volume are prepared and the tap densities of the mixed particles in the positive plates are made different from each other. In this case, the volume of the positive mixture to be filled in the positive substrate becomes larger for the positive plate that contains the mixed particles with a low tap density. When the tap density becomes lower, therefore, the ratio of the volume of the positive mixture occupying the pores in the positive substrate becomes larger, thus making the residual space in the positive substrate smaller. If the tap density is too low, therefore, when an oxygen gas is produced in the positive plate at the time of overcharging, the inner pressure of the battery rises immediately, actuating the relief valve to cause the alkaline electrolyte, together with the oxygen gas, to leak out of the battery. When the tap density is low, therefore, the mass of the battery decreases and the overcharge characteristic falls.

In this respect, the tap density of the mixed particles is set equal to or higher than 2.1 g/cm$^3$ and the ratio of the volume of the positive mixture occupying the pores in the positive substrate is limited in this mode. This secures the residual space in the positive substrate so that the alkaline electrolyte is held in the residual space. Accordingly, the gas transmissivity in the separator is improved and an early rise of the inner pressure at the time of overcharging is prevented. This prevents leakage of the alkaline electrolyte caused by the actuation of the relief valve and a reduction in overcharge characteristic originated from the leakage in the battery.

Moreover, according to this mode, the tap density of the mixed particles is set equal to or lower than 2.3 g/cm$^3$, thereby preventing a reduction in high-rate charge characteristic.

When the tap density of the mixed particles becomes higher than 2.3 g/cm$^3$, a variation occurs in the distribution of the mixed particles in the positive mixture, i.e., the distribution of nickel hydroxide particles. In this case, at the time of high-rate charging, the charge reaction ends faster at that portion of the positive plate which contains fewer nickel hydroxide particles than at that portion of the positive plate which contains a larger number of nickel hydroxide particles, thereby producing an oxygen gas. While the oxygen gas is reduced in the negative plate, the reducing reaction raises the temperature of the battery.

In this mode, therefore, the tap density of the mixed particles is set equal to or lower than 2.3 g/cm$^3$ to suppress a variation in the distribution of the mixed particles in the positive mixture. Accordingly, the nickel hydroxide particles are distributed uniformly over the entire positive plate, thereby preventing local generation of an oxygen gas at the time of high-rate charging and a rise in the temperature of the battery originated from the reaction of reducing the oxygen gas.

As a preferable mode, the frame of the substrate includes frame elements located on an inner surface side of the positive plate are thicker than that located on an outer surface side of the positive plate.

In the electrode assembly, the gap between the positive plate and the negative plate is narrower at the area between the inner surface side of the positive plate in the radial direction and the outer surface side of the negative plate in the radial direction than at the area between the outer surface side of the positive plate in the radial direction and the inner surface side of the negative plate in the radial direction. Therefore, the battery reaction progresses more on the inner surface side of the positive plate than on the outer surface side. According to this mode, therefore, the elements of the frame of the positive substrate are formed thicker on the inner surface side than on the outer surface side, thus enhancing the conductivity on the inner surface side of the positive plate. This prevents the generation of heat on the inner surface side of the positive plate at the time of high-rate charging, restraining a rise in the temperature of the battery.

As a preferable mode, the negative plate includes a negative substrate made of a metal conductive sheet and having a plurality of through holes, an inner surface and an outer surface in view of a radial direction of the electrode assembly; and a negative active material layer deposited on the negative substrate and including an inner layer which covers the inner surface of the negative substrate and has an overlapping portion overlapping the positive plate adjacent thereto via the separator, an outer layer which covers the outer surface of the negative substrate and has an overlapping portion overlapping the positive plate adjacent thereto via the separator, and a filler filled in the through holes of the negative substrate, the filler having filling portions distributed in an area of the negative substrate that is covered by the overlapping portion of the inner layer and the outer layer on at least one side thereof; and a total amount of the negative active material contained in the overlapping portions of the inner layer and the outer layer and in the filling portions of the filler ranges from 75% of an amount of the negative active material contained in the entire negative plate to 100%.

In the structure, the ratio of the total amount of the negative active material contained in the overlapping portion of the inner layer and the outer layer and in the filling portions of the filler with respect to the amount of the overall negative active material contained in the negative plate (hereinafter called "ratio of the opposing portion") is set in a range from 75% to 100%, thereby suppressing a reduction in battery characteristic, such as the battery life or the discharge characteristic.

The negative plate has a portion where the positive plate is placed only on one surface side via the separator and a portion where the positive plate is placed on neither surface side. Therefore, the inner layer and outer layer that cover the individual sides of the negative substrate have an overlapping portion which is overlaid on the positive plate via the separator and a non-overlapping portion which is not overlaid on the positive plate. The overlapping portion contributes to the battery reaction less than the non-overlapping portion. In this respect, in the structure, the ratio of the opposing portion, which is approximately 70% in the battery according to the prior art, is set in a range from 75% to 100%, so that the amount of the negative active material contained in the non-overlapping portion is limited, thereby securing the amount of the negative active material contained in the overlapping portion. In the battery, therefore, the battery reaction progresses uniformly over the entire positive plate at the time of charging/discharging. This prevents early local degradation of the active material and leakage of the alkaline electrolyte which is caused by a rise in the inner pressure of the battery originated from the delayed reaction of reducing an oxygen gas, thereby suppressing shortening of the battery life.

As a preferable mode, the negative plate includes a negative substrate made of a metal conductive sheet and having a plurality of through holes, an inner surface and an outer surface in view of a radial direction of the electrode assembly; and a negative active material layer deposited on the negative substrate and including an inner layer that covers the inner surface of the negative substrate and has an overlapping portion overlapping the positive plate adjacent thereto via the separator, and a non-overlapping portion which does not overlap the positive plate, an outer layer that covers the outer surface of the negative substrate and has an overlapping portion overlapping the positive plate adjacent thereto via the separator and a non-overlapping portion which does not overlap the positive plate, and a filler filled in the through holes of the negative plate; and at least the non-overlapping portion of the outer layer in the negative active material layer of the negative plate forming the outermost portion of the electrode assembly has a thin section having a thickness equal to or less than a half of a thickness of the overlapping portion.

The structure suppresses a reduction in battery life by forming a thin section whose thickness is equal to or less than half the thickness of the overlapping portion at the non-overlapping portion of at least the outer layer of the negative active material layer of the negative plate which forms the outermost portion of the electrode assembly.

The non-overlapping portion of the negative active material layer which forms the outermost portion of the electrode assembly contributes to the battery reaction less than the overlapping portion. According to the structure, therefore, a thin section is formed at least at the non-overlapping portion of the outer layer in the negative active material layer which is longer than the non-overlapping portion of the inner layer at the time of reducing the volume of the negative plate placed at the outermost portion of the electrode assembly. This surely reduces the amount of the negative active material in the non-overlapping portion while securing the amount of the negative active material in the overlapping portion. In the battery, therefore, the battery reaction progresses uniformly over the entire positive plate at the time of charging/discharging. This prevents early local degradation of the active material and leakage of the alkaline electrolyte which is caused by a rise in the inner pressure of the battery originated from the delayed reaction of reducing an oxygen gas, thereby suppressing shortening of the battery life.

As a preferable mode, each of the negative plate and the positive plate has an inner end portion and an outer end portion corresponding to a beginning of winding of the electrode assembly and an end of winding thereof, respectively, the inner end portion of the negative plate extending over the inner end portion of the positive plate from outside of the positive plate in view of a radial direction of the electrode assembly, and at least the non-overlapping portion of the inner layer in the negative active material layer of the inner end portion of the negative plate has a thin section with a reduced thickness.

The structure further has a thin section at least at the non-overlapping portion of the inner layer in the negative active material layer on the inner end side of the negative plate, which is longer than the non-overlapping portion of the outer layer. This secures a larger amount of the negative active material to be contained in the overlapping portion, thereby suppressing a reduction in battery life more reliably.

As a preferable mode, an area covered with the overlapping portions of the inner layer and outer layer and an area covered with the thin section differ in a numerical aperture of the through holes in the negative substrate.

In this mode, the numerical aperture of the through holes in the negative substrate is changed in such a way that the negative substrate is reinforced at the thin portion of the negative plate. That is, the numerical aperture of the through holes is changed according to the thicknesses of the inner layer and outer layer to be supported. This prevents the negative substrate in the battery from being cracked or broken at the thin area of the negative plate at the time of winding. This results in prevention of an increase in inner resistance originated from cracking or breaking of the negative substrate and heat generation based on the increased resistance at the time of charging/discharging. The structure also prevents short-circuiting from occurring as a result of the cracked or broken portion breaking through the separator and contacting the positive plate.

As a preferable mode, the volume of the negative plate is set equal to or less than 65% of the volume of the positive plate.

According to this mode, setting the volume of the negative plate equal to or less than 65% of the volume of the positive plate efficiently increases the amount of the positive active material, achieving a volume energy density of 340 Wh/l or higher.

The volume of the negative plate is the volume of the negative plate which is computed from the thickness of the negative plate at plural locations in the lengthwise direction of the negative plate measured with a micrometer after the battery is disassembled to remove the negative plate and the removed negative plate is dried, and the length and width of the negative plate measured with a ruler or the like.

As a preferable mode, the capacity-electrolyte ratio which is obtained by dividing the volume of the alkaline electrolyte by the 0.2 C capacity is 0.85 ml/Ah or less.

In a battery having a volume energy density of 340 Wh/l or greater, as the volumes of the negative plate, the separator and the alkaline electrolyte decrease, the excess space in the battery excluding those volumes and the volume of the positive plate decreases as well. When the alkaline electrolyte is injected into the reduced excess space in order to guarantee the battery life, the space where the oxygen gas produced in the positive plate is temporarily stored is gone. When the oxygen gas is produced in the positive plate at the time of charging, therefore, the inner pressure rises immediately, actuating the relief valve so that the alkaline electrolyte leaks out. According to the mode, therefore, the capacity-electrolyte ratio is set equal to 0.85 ml/Ah or less to secure the excess space, thereby preventing leakage of the alkaline electrolyte caused by the actuation of the relief valve.

As a preferable mode, the electrode assembly have a cavity in the center, which has an inside diameter of 30% or less than the outside diameter of the case.

According to this mode, as the inside diameter of the cavity is 30% or less than the outside diameter of the case, shortening of the battery life is suppressed more surely.

When the ratio of the inside diameter of the cavity of the electrode assembly exceeds 30% of the outside diameter of the case, an oxygen gas produced in the positive plate is likely to remain in the cavity at the time of charging, delaying the reducing reaction in the negative plate. According to this mode, therefore, while the inside diameter of the cavity is 30% or less than the outside diameter of the case, the space for temporary storage of the oxygen gas, which corresponds to the reduction in cavity, is dispersed inside the battery. This prevents delay of the reaction of reducing the oxygen gas, thereby preventing the actuation of the relief valve caused by a rise in inner pressure.

As a preferable mode, the case has an open end and a lid plate fixed to the open end; and the battery further includes a positive lead which is laid out between the electrode assembly and the lid plate and has an end portion welded to one side of the positive plate and a bent portion bent between the electrode assembly and the lid plate, wherein the percentage of a value obtained by dividing a first value by a second value lies in a range of 90% to 100%, the first value being obtained by subtracting the lateral cross-sectional area of the cavity subtracted from the lateral cross-sectional area of the electrode assembly, the second value being obtained by subtracting the lateral cross-sectional area of the cavity subtracted from the lateral cross-sectional area of the inner space of the case.

As the percentage (hereinafter called "ratio of the cross-sectional area of the electrode assembly") is set equal to or greater than 90% in this mode, an increase in inner resistance is further prevented.

When the ratio of the cross-sectional area of the electrode assembly is low, the compressing force applied to the electrode assembly by the inner wall of the case from both radial sides becomes smaller, so that the degree of constriction of the electrode assembly becomes lower. In this case, when the positive lead whose end portion is welded to one side of the positive plate is bent for placing the lid plate in the opening edge of the case, a large load is applied to the welded place of the positive plate where the end portion of the positive lead is welded. Then, the positive plate breaks at the welded place, resulting in an increased inner resistance. In this respect, the ratio of the cross-sectional area of the electrode assembly in the battery is set equal to or greater than 90% to increase the compressing force applied to the electrode assembly, thereby making the degree of constriction of the electrode assembly larger. This allows the welded place of the positive plate to be held by the negative plate from both radial sides via the separator. This prevents deformation of the positive plate at the welded place at the time the positive lead is bent. As a result, breaking of the positive plate in the battery at the welded place is prevented, thereby preventing an increase in inner resistance.

A further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

An AA-size cylindrical nickel hydrogen secondary battery according to one embodiment of the invention will be described in detail below with reference to the accompanying drawings.

Figure 1:
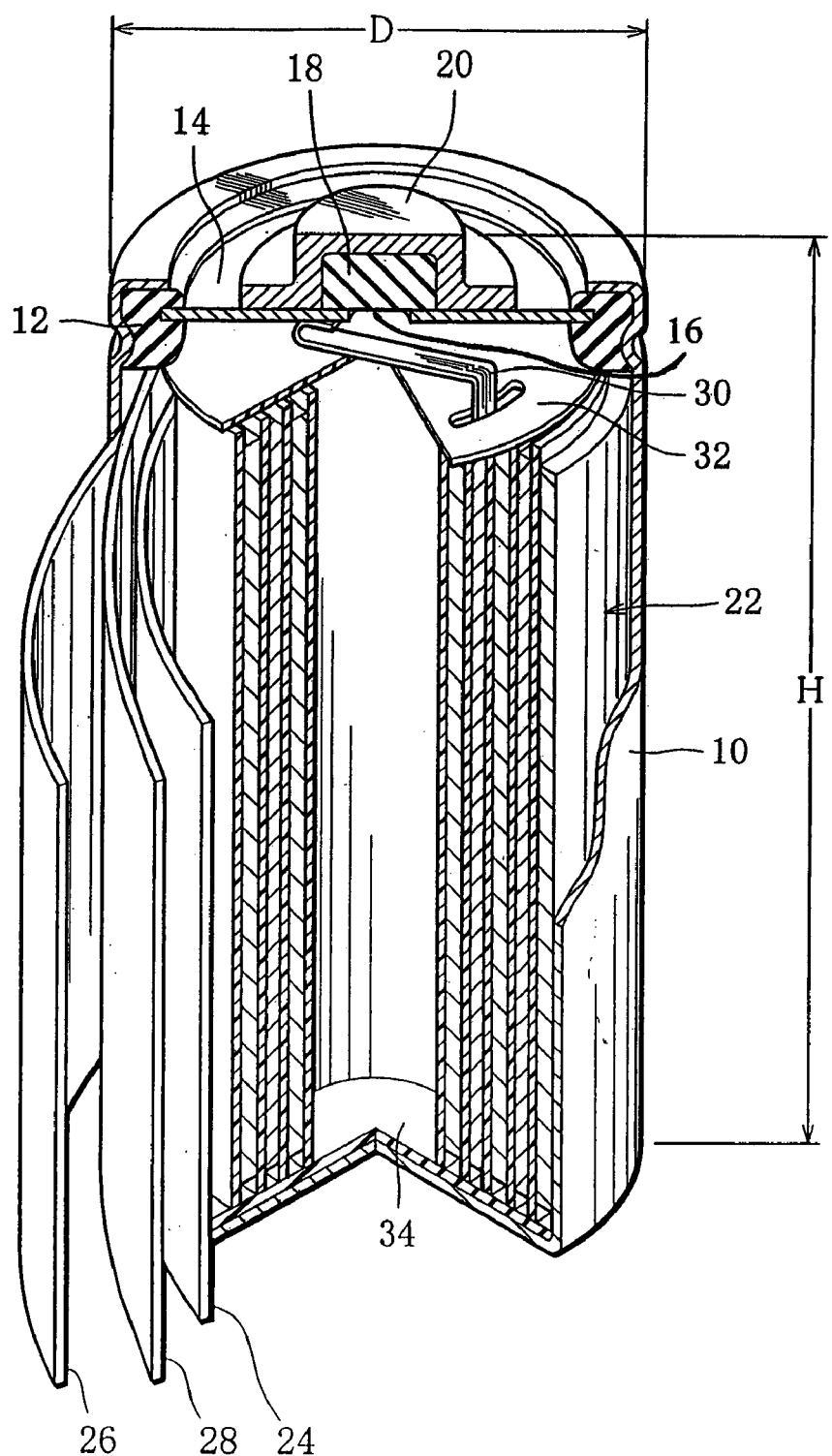
FIG. 1 is a partly cutaway perspective view illustrating a cylindrical nickel hydrogen secondary battery according to one embodiment of the invention.

As shown in FIG. 1, the battery has a case 10 which has a bottomed cylindrical shape with one end open. The case 10 has an outside diameter D set in a range from 13.5 mm to 14.5 mm. The case 10 has a conductivity and serves as a negative terminal. A conductive lid plate 14 is placed in the opening of the case 10 via a ring-shaped insulating packing 12 and the insulating packing 12 and the lid plate 14 are secured in the opening by caulking the edge of the opening.

The lid plate 14 has a vent hole 16 in the center with a rubber valve element 18 placed on the outer surface of the lid plate 14, blocking the vent hole 16. A cylindrical positive terminal 20 with a flange which covers the valve element 18 is fixed to the outer surface of the lid plate 14, and protrudes from the case 10 in the axial direction on the open end side. The positive terminal 20 presses the valve element 18 against the lid plate 14. Normally, the case 10 is closed together with the insulating packing 12 and the valve element 18 with the lid plate 14. When a gas is produced in the case 10 and its inner pressure of the battery rises, the valve element 18 is compressed, causing the gas to be discharged from the case 10 through the vent hole 16. That is, the lid plate 14, the valve element 18 and the positive terminal 20 form a relief valve which actuates at a predetermined inner pressure.

The length from the distal end of the positive terminal 20 to the bottom of the case 10, i.e., the height, H, of the battery lies within a range from 49.2 mm to 50.5 mm. The volume, Vb, of the battery is taken as equal to the volume of a cylinder with the outside diameter D and the height H and is defined by the following equation.

$$Vb = \pi(D/2)^2 \times H$$

Approximately cylindrical electrode assembly 22 are contained in the case 10 and the outermost portion of the electrode assembly 22 directly contacts the inner wall of the case 10. The electrode assembly 22 comprise a positive plate 24, a negative plate 26 and a separator 28 and are formed by spirally winding the positive plate 24 and the negative plate 26 via the separator 28. That is, the positive plate 24 and the negative plate 26 are overlaid each other alternately in the radial direction of the electrode assembly 22 via the separator 28. The negative plate 26 is wound around the outermost portion of the electrode assembly 22 and is electrically connected to the case 10 at the outermost portion of the electrode assembly 22.

A positive lead 30 is placed between one end of the electrode assembly 22 and the lid plate 14 in the case 10, and both ends of the positive lead 30 are welded to the positive plate 24 and the lid plate 14. Therefore, the positive terminal 20 is electrically connected to the positive plate 24 via the positive lead 30 and the lid plate 14. More specifically, the positive lead 30 has a belt-like shape and is bent between the electrode assembly 22 and the lid plate 14 and contained in the case in that form when the lid plate 14 is placed in the opening of the case 10. That end portion of the positive lead 30 which lies on the electrode assembly 22 side is welded in such a way as to be in a plane contact with one side of the positive plate 24. A circular insulating member 32 is placed between the lid plate 14 and the electrode assembly 22 and the positive lead 30 extends through a slit provided in the insulating member 32. A circular insulating member 34 is likewise placed between the electrode assembly 22 and the bottom of the case 10.

Figure 2:
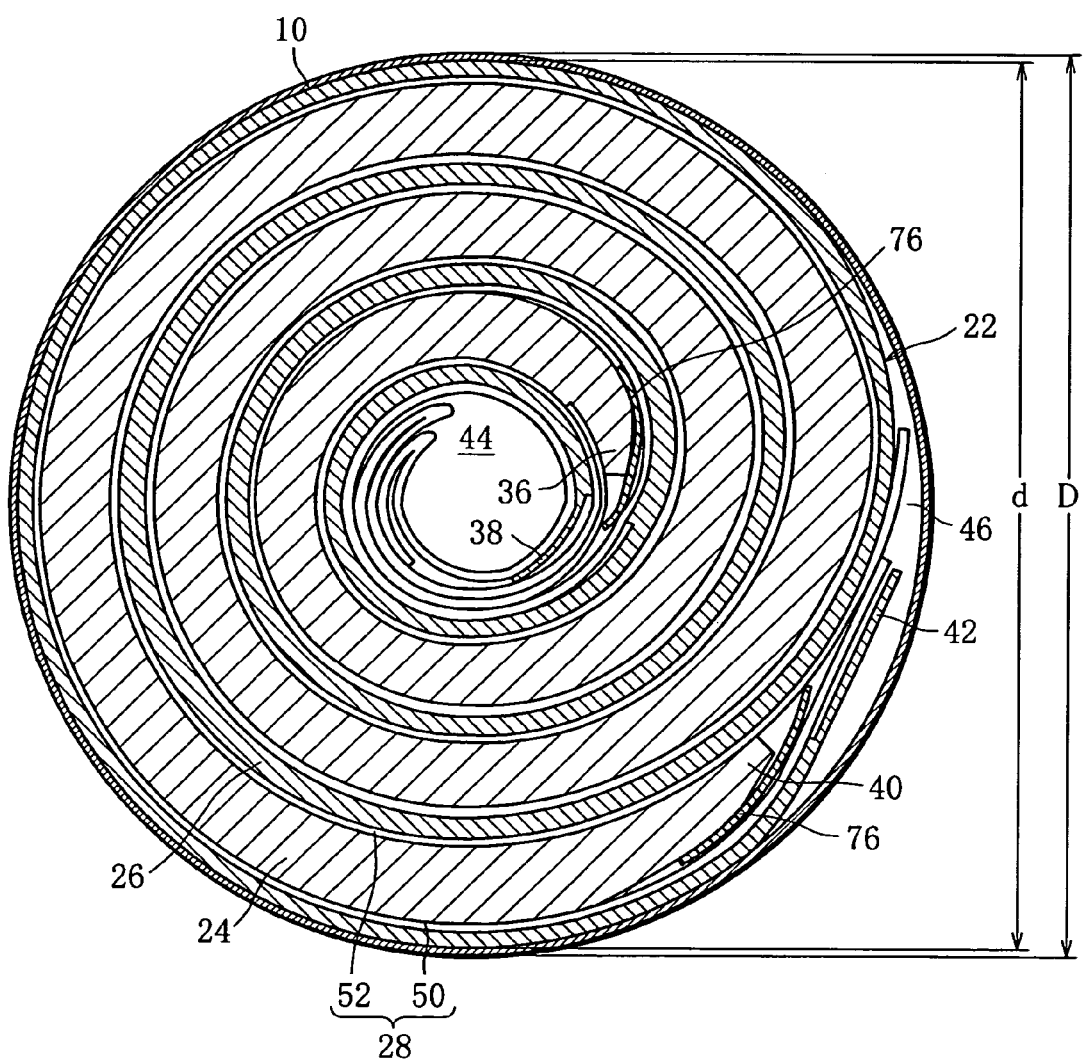
FIG. 2 is a lateral cross-sectional view of the battery in FIG. 1.
Figure 3A:
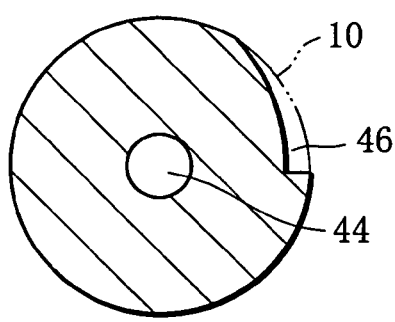
FIG. 3A is an exemplary diagram showing the lateral cross-sectional area of electrode assembly in the battery in FIG. 1.
Figure 3B:
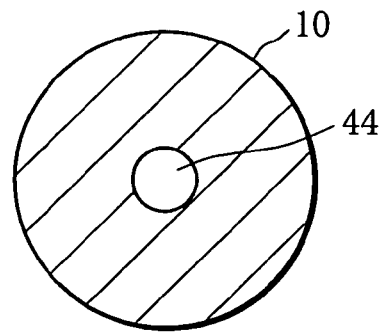
FIG. 3B is an exemplary diagram showing a lateral cross-sectional area obtained by subtracting the cross-sectional area of a cavity of the electrode assembly from the cross-sectional area of the inside of a case.

More specifically, the electrode assembly 22 are formed by spirally winding the belt-like positive plate 24 and the belt-like negative plate 26 via the belt-like separator 28 from their one end sides using a winding core. As shown in FIG. 2, therefore, one end portions (inner end portions) 36 and 38 of the positive plate 24 and the negative plate 26 are positioned on the center axis side of the electrode assembly 22, while the other end portions (outer end portions) 40 and 42 of the positive plate 24 and the negative plate 26 are positioned on the outer surface side of the electrode assembly 22. The negative plate 26 is longer than the positive plate 24, the negative inner end portion 38 is wound inward of the positive inner end portion 36 in view of the radial direction of the electrode assembly 22, the negative outer end portion 42 is wound outward of the positive outer end portion 40 in view of the radial direction of the electrode assembly 22. The negative inner end portion 38 extends over the positive inner end portion 36 in the circumferential direction of the electrode assembly 22 on the inner surface side of the positive plate 24 facing toward the center axis of the electrode assembly 22, while the negative outer end portion 42 extends over the positive outer end portion 40 in the circumferential direction of the electrode assembly 22 on the outer surface side of the positive plate 24 facing toward the outer surface of the electrode assembly 22. Therefore, the positive plate 24 is held by the negative plate 26 via the separator 28 from both radial sides over the entire lengthwise direction. The negative plate 26, not the separator 28, is wound around the outermost portion of the electrode assembly 22 and the negative plate 26 is electrically connected to the case 10 at the outermost portion of the electrode assembly 22. Because the winding core is removed from the electrode assembly 22 after winding, the electrode assembly 22 have a cavity 44, corresponding in shape to the winding core, in the center. The lateral cross-sectional area of the electrode assembly 22 is a value obtained by subtracting the cross-sectional area of the cavity 44 and the cross-sectional area of a clearance 46 formed between the electrode assembly 22 and the case 10 from the cross-sectional area of the interior of the case 10, as indicated by hatches in FIG. 3A. As a preferable mode of the battery, the percentage (electrodes cross-sectional area ratio) of a value obtained by dividing the lateral cross-sectional area of the electrode assembly 22 by a value obtained by subtracting the cross-sectional area of the cavity 44 from the cross-sectional area of the inner wall space of the case 10 or a lateral cross-sectional area indicated by hatches in FIG. 3B lies in a range of 90% to 100%.

Available as the separator 28 is, for example, a nonwoven fabric made of polyamide fibers or a nonwoven fabric made of polyolefin fibers, such as polyethylene or polypropylene, to which a hydrophilic functional group is given.

Figure 4:
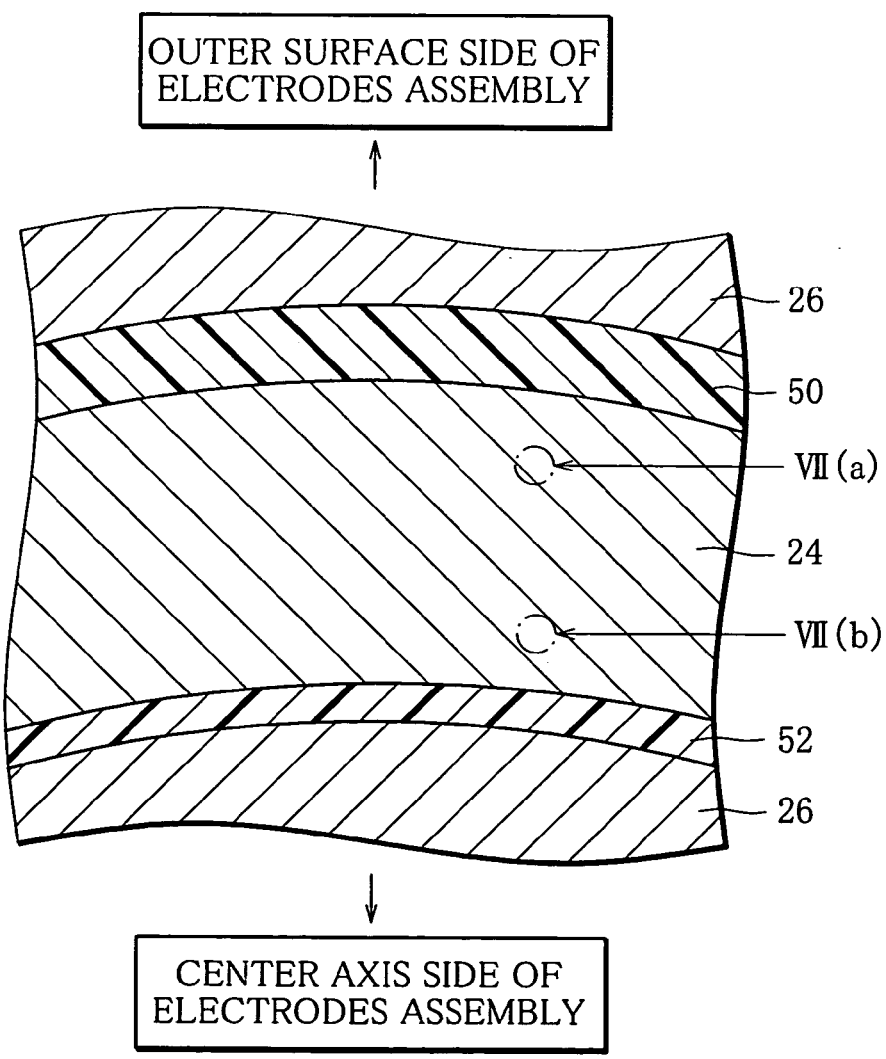
FIG. 4 is a lateral cross-sectional view illustrating a part in FIG. 2 in enlargement.

As a preferable mode of the embodiment, as shown in FIG. 4, a first separator 50 and a second separator 52 are wound as the separator 28. The first separator 50 is inserted between the radial outer surface of the positive plate 24 and the radial inner surface of the negative plate 26. The second separator 52 is inserted between the radial inner surface of the positive plate 24 and the radial outer surface of the negative plate 26. The first separator 50 and the second separator 52 differ from each other in thickness and length, and the first separator 50 is thicker than the second separator 52. The average thickness of the first and second separators 50 and 52, i.e., the average thickness of the separator 28, is set equal to or less than 2.5 times the thickness of the positive plate 24 which will be discussed later. The average thickness of the separator 28 is acquired by dividing a value, which is obtained by adding a value given by multiplying the length of the first separator 50 by its thickness and a value given by multiplying the length of the second separator 52 by its thickness, by a value given by adding the length of the first separator 50 and the length of the second separator 52 together.

The thicknesses of the first and second separators 50 and 52 are the average thicknesses of the first and second separators 50 and 52 obtained by measuring the thicknesses at plural locations in the lengthwise direction of each separator with a micrometer after the battery is disassembled to remove the first and second separators 50 and 52 and the removed separators are dried. The lengths of the first and second separators 50 and 52 are likewise the lengths of the first and second separators 50 and 52 obtained by measuring their lengths with a ruler or the like after the battery is disassembled to remove the first and second separators 50 and 52 and the removed separators are dried.

A single separator may be used as the separator 28. In this case, that portion of the separator 28 which is inserted between the radial outer surface of the positive plate 24 and the radial inner surface of the negative plate 26 and that portion of the separator 28 which is inserted between the radial inner surface of the positive plate 24 and the radial outer surface of the negative plate 26 are connected on the center axis side of the electrode assembly 22.

The positive plate 24 has a shape and a size in such a way that the ratio of the volume of the positive plate 24 to the characteristic volume of the case 10 becomes 65% or greater.

The characteristic volume of the case 10 is defined as a volume of a cylindrical space having an axial length equal to the electrode assembly 22 excluding the separator 28 and a diameter equal to the inside diameter of the case 10. The volume of the positive plate 24 is the volume of the positive plate 24 contained in the case 10, which is acquired by multiplying the circumferential length of the positive plate 24, the radial thickness thereof and the axial length thereof by one another. Those thickness and lengths are measured on the longitudinal cross-sectional image and lateral cross-sectional image of the battery taken by an X-ray CT apparatus. The circumferential length is the circumferential length of the inner surface of the positive plate 24 in the radial direction and is nearly equivalent to the length of the positive plate 24 before winding. The radial thickness and the axial length are approximately equivalent to the thickness and width of the positive plate 24 before winding, respectively.

Figure 5:
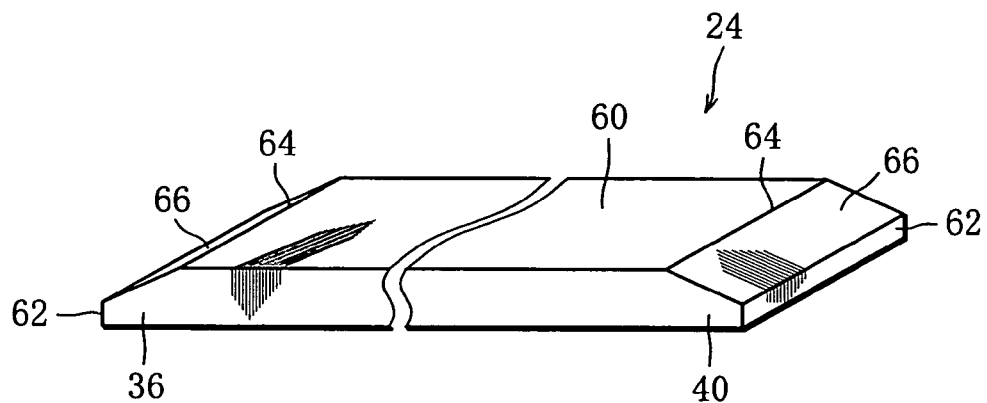
FIG. 5 is a perspective view showing a positive plate to be used in the battery in FIG. 1 in a developed state.
Figure 6:
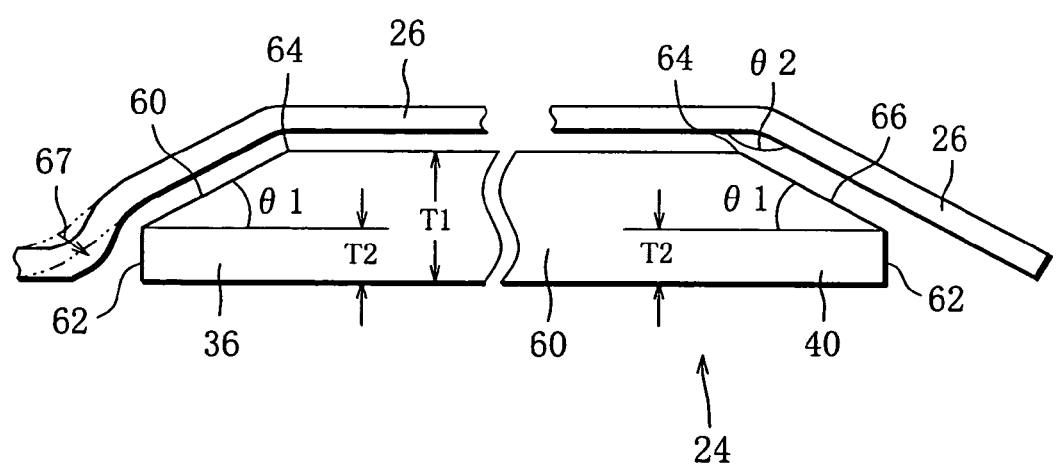
FIG. 6 is an exemplary diagram for explaining bending of a negative plate in the vicinity of the inner end portion and outer end portion of the positive plate.

As shown in FIGS. 5 and 6 in developed forms, the positive plate 24 as a preferable mode has a positive main portion 60 having a given thickness T1 over the entire lengthwise direction. The thickness T1 is set to 0.95 mm or greater. The positive inner end portion 36 and the positive outer end portion 40 are so formed as to become narrower toward the distal end (end face 62) from the positive main portion 60. More specifically, the positive inner end portion 36 and the positive outer end portion 40 are formed in such a way that the radial outer surfaces extending toward the distal ends from edges 64 which are boundaries with the positive main portion 60 are formed as inclined surfaces 66 and the thickness of the positive plate 24 gradually decreases at a given change ratio toward the distal ends from the edges 64. The inclined surfaces 66 can be formed on the outer surfaces of the positive inner end portion 36 and positive end portion 40 by cutting or pressing as will be discussed later. As burrs produced at the time of forming the inclined surfaces 66 are present at and around the edges 64, the edges 64 are covered with a protection member 76 to be discussed later. As a preferable mode, the radial inner surface of the positive plate 24 is level across the boundary between the positive inner end portion 36 and the positive outer end portion 40 and the positive main portion 60. Therefore, no burrs are present at the boundary of the radial inner surface.

The thickness of the positive plate 24 or the thickness of the positive main portion 60 is the thickness of the positive plate 24 contained in the case 10 as mentioned above and is measured on the lateral cross-sectional image of the battery taken by an X-ray CT apparatus.

As a preferable mode of the embodiment, an inclination angle θ1 of the inclined surface 66 is set over 0° and equal to or smaller than 60°, and the ratio of a thickness T2 at the distal ends of the positive inner end portion 36 and the positive outer end portion 40 to a thickness T1 of the positive main portion 60 is set in a range from 10% to 70%. Accordingly, as shown exemplarily in FIG. 6, an internal angle θ2 of that portion of the negative plate 26 which is laid along the radial outer surface side of the positive plate 24 in the electrode assembly 22 inserted in the case 10 via the separator 28 and is bent at the edge 64 is kept equal to or greater than 160°.

The positive plate 24 includes a conductive positive substrate and a positive mixture supported by the positive substrate. The positive mixture contains positive active material particles, various additive particles for improving the characteristic of the positive plate, and a binder for binding the mixed particles of the positive active material particles and the additive particles to the positive substrate.

The amount of the positive active material contained in the positive mixture of the positive plate 24 is set in such a way that the volume energy density of the battery lies in a range from 340 Wh/l to 450 Wh/l. The volume energy density of the battery is acquired by dividing a value, which is obtained by multiplying the 0.2 C capacity of the battery by 1.2 V as an operational voltage, by the volume Vb of the battery. The 0.2 C capacity of the battery is defined by JIS C8708-1997, and is specifically the capacity when the battery is charged for sixteen hours with a current whose flow rate is equivalent to 0.1 C, is then stopped for one to four hours, is then discharged to the discharge end voltage of 1.0 V with a current whose flow rate is equivalent to 0.2 C at the ambient temperature of 20+5° C.

As a preferable mode of the embodiment, the tap density of the mixed particles of the positive active material particles and the additive particles lies in a range from 2.1 g/cm$^3$ to 2.3 g/cm$^3$. The tap density is an apparent density by a tap method defined in JIS K5101. Specifically, the tap density is acquired by measuring the volume of the mixed particles after a tapped measuring cylinder containing an arbitrary amount of mixed particles is dropped from a given height by a predetermined number of times and dividing the mass of the mixed particles by the obtained volume. For the same mass, therefore, mixed particles with a higher tap density have a smaller volume than mixed particles with a lower tap density.

As the battery is a nickel hydrogen secondary battery, the positive active material particles are nickel hydroxide particles. The nickel hydroxide particles may have cobalt, zinc, cadmium or the like dissolved or may have the surface coated with a cobalt compound. Not particularly restrictive, besides yttrium oxide, a cobalt compound, such as cobalt oxide, metal cobalt or a cobalt hydroxide, a zinc compound, such as metal zinc, zinc oxide or zinc hydroxide, or a rare-earth compound, such as erbium oxide, may be used as the additive particles, and hydrophilic or hydrophobic polymer may be used as the binder.

Figure 7A:
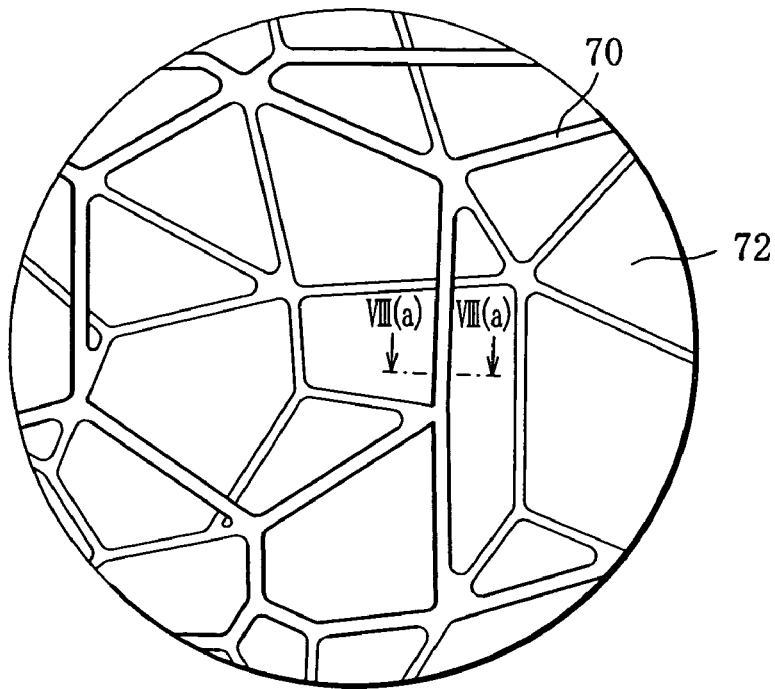
FIG. 7A is an exemplary diagram illustrating the positive substrate of the positive plate in an area VII(a) in FIG. 4 in enlargement.
Figure 7B:
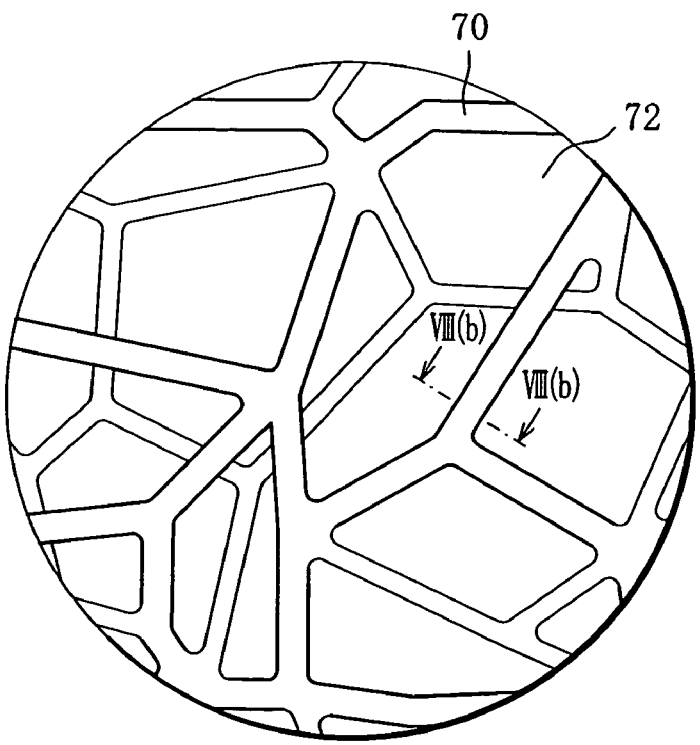
FIG. 7B is an exemplary diagram illustrating the positive substrate of the positive plate in an area VII(b) in FIG. 4 in enlargement.

As a preferable mode of the embodiment, a nickel positive substrate is used as the positive substrate which holds the positive mixture. As shown in FIGS. 7A and 7B excluding the positive mixture, the positive substrate has a three-dimensional mesh-like frame 70 and pores 72 formed by the frame 70. Therefore, the positive substrate has the positive mixture filled in the pores 72.

FIG. 7B is an exemplary diagram illustrating the positive substrate of the positive plate 24 on the radial inner surface side in enlargement. FIG. 7A is an exemplary diagram illustrating the positive substrate of the positive plate 24 on the radial outer surface side in enlargement. As a preferable mode of the embodiment, the elements of the frame 70 of the positive substrate are thicker on the inner surface side of the positive plate 24 than on the outer surface side with the nearly center of the positive plate 24 in the thickness direction being the boundary.

Figure 8A:
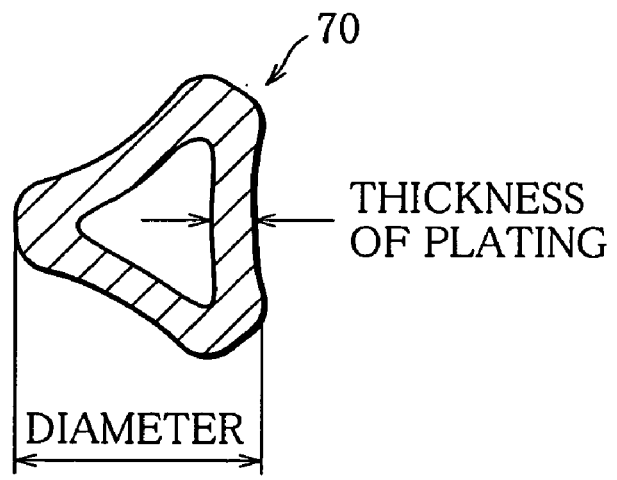
FIG. 8A is an exemplary diagram illustrating a cross section along the line VIII(a)-VIII(a) in FIG. 7A.
Figure 8B:
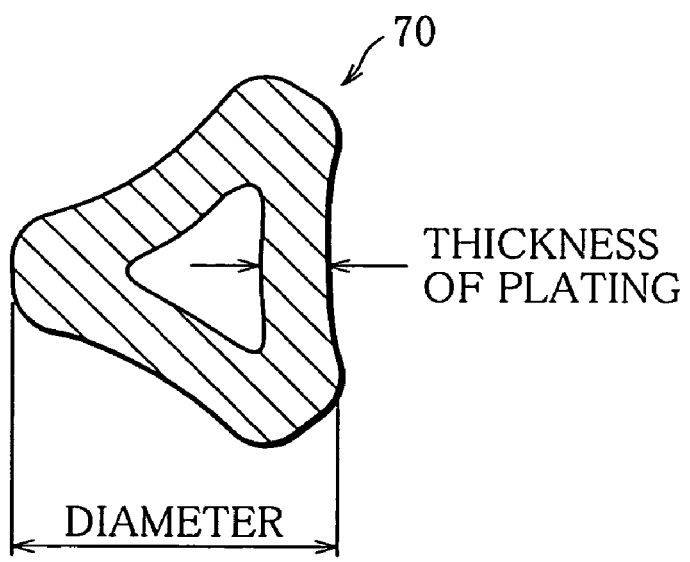
FIG. 8B is an exemplary diagram illustrating a cross section along the line VIII(b)-VIII(b) in FIG. 7B.

More specifically, the positive substrate is prepared through calcination and reduction of nickel-plated urethane foam. As shown in FIGS. 8A and 8B, the elements of the frame 70 are hollow and the plated thickness of the frame 70 is thicker on the radial inner surface side of the positive plate 24 than on the outer surface side. In other words, the frame 70 has a larger amount of nickel plating (amount of plating) on the inner surface side than on the outer surface side.

The positive mixture is filled in the pores 72 in the positive substrate at a predetermined filling density D. As a preferable mode of the embodiment, the filling density D is set equal to or greater than 2.95 g/cm$^3$. The filling density D is the mass of the positive mixture filled per the unit volume of the pores 72 in the positive substrate and is acquired as follows.

First, the weight, Wp, and the volume, Vp, of the positive plate 24 are measured, after which the positive mixture is removed from the positive substrate, then the mass Ws of the positive substrate is measured. Next, the mass Ws of the positive substrate is subtracted from the weight Wp of the positive plate 24 to acquire the mass, Wa, of the positive mixture. The volume, Vs, of the frame 70 of the positive substrate is acquired by dividing the mass Ws of the positive substrate by a true specific gravity p of nickel as the material for the positive substrate. Thereafter, the volume, Vc, of the pores 72 in the positive substrate is acquired by subtracting the volume Vs from the volume Vp of the positive plate 24. Then, the filling density D of the positive mixture is acquired by dividing the mass Wa of the positive mixture by the cavity volume Vc. Each one of the masses Wp, Ws and Wa are dried mass, and to remove the positive mixture from the positive substrate, the positive plate 24 should be vibrated in a solvent using, for example, an ultrasonic cleaner.

Figure 9:
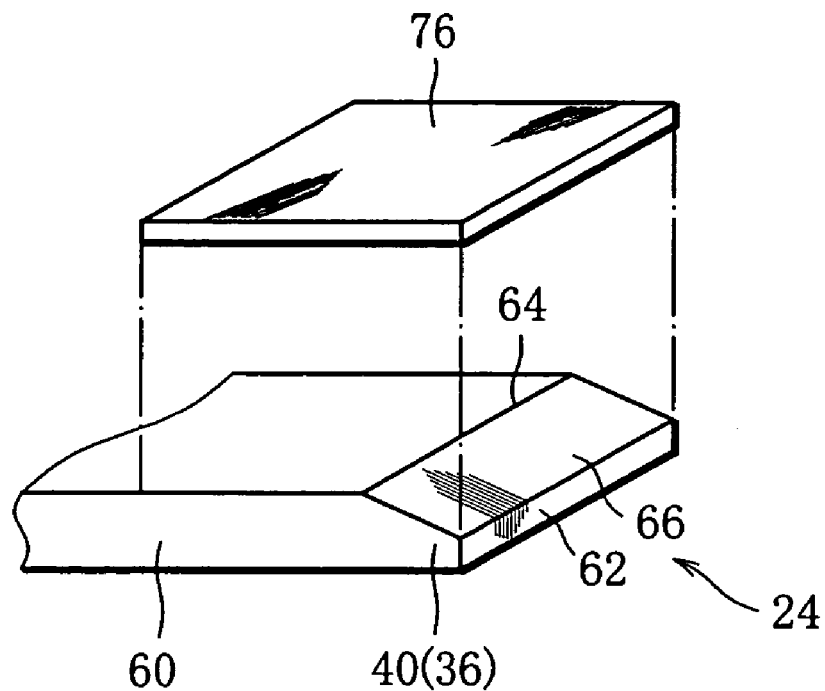
FIG. 9 is a perspective view showing a part of the positive plate and a protection member in FIG. 5 in a developed state.
Figure 10:
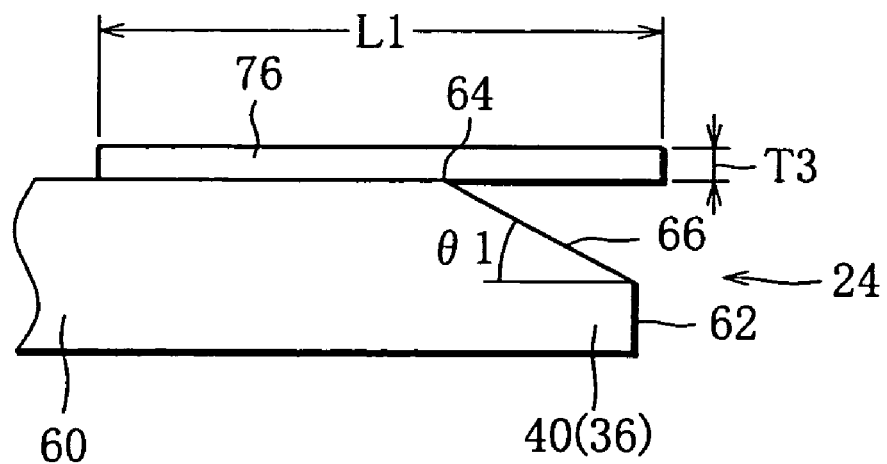
FIG. 10 is a side view showing the positive plate and the protection member in FIG. 9 overlapping each other.

The protection member 76 is inserted between the positive plate 24 and the first separator 50 adjoining to the radial outer surface of the positive plate 24 and covers the boundary between the positive main portion 60 and the positive inner end portion 36 and the positive outer end portion 40. The protection member 76 has an insulating property and has a sheet-like shape to be able to cover the entire edges 64 of the positive plate 24 as shown in FIGS. 9 and 10 in an developed form.

Though not particularly restrictive, the size of each protection member 76 is set in such a way that burrs at and around the edge 64 do not penetrate through the protection member 76 and the first separator 50 when the electrode assembly 22 are inserted into the case 10. It is however preferable that a thickness T3 of the protection member 76 should lie in a range from 10 μm to 200 μm, and a length L1 of the protection member 76 as seen in the lengthwise direction of the positive plate 24 should lie in a range from 1 mm to 30 mm for the following reason. When the length L1 is less than 1 mm, it is difficult for the protection member 76 to surely cover the edge 64, whereas when the length L1 exceeds 30 mm, the occupying volume of the protection member 76 in the battery becomes large, lowering the volume energy density.

Though not particularly restrictive, the material for and the form of the protection member 76 are also set in such a way that burrs at and around the edge 64 do not penetrate through the protection member 76 and the separator 28 when the electrode assembly 22 are inserted into the case 10. It is however preferable that the material for the protection member 76 should be polyolefin-based polymer having both alkaline resistance and hydrophilic properties, such as PP (polypropylene), and the form of the protection member 76 should be a nonwoven fabric, a sheet or a tape.

Figure 11:
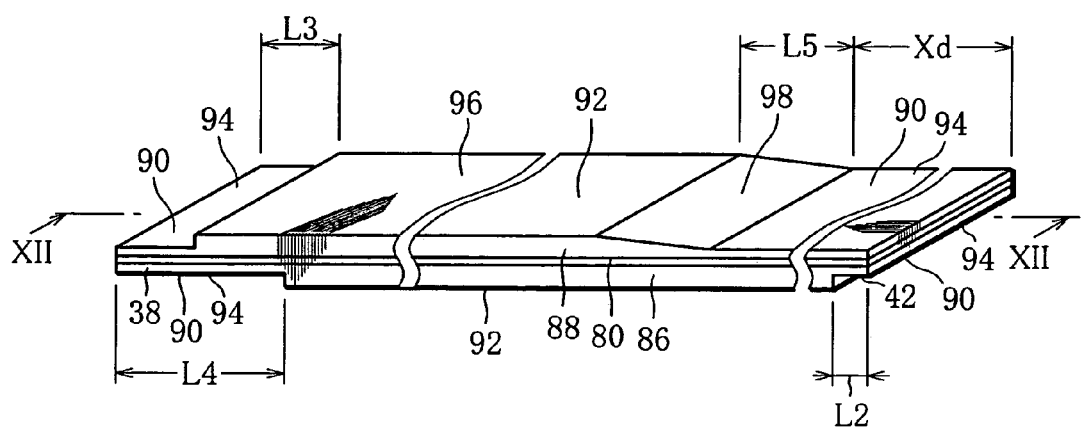
FIG. 11 is a perspective view showing the negative plate to be used in the battery in FIG. 1 in a developed state.
Figure 12:
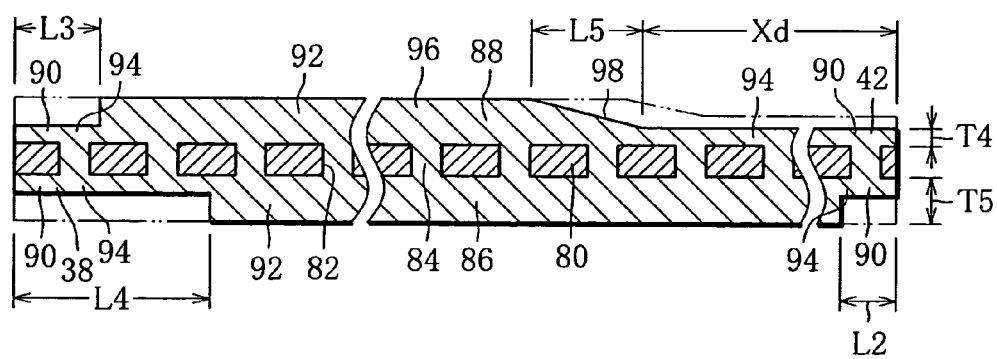
FIG. 12 is a cross-sectional view along the line XII-XII in FIG. 11.

The negative plate 26 has a belt-like conductive negative substrate 80 as shown in FIGS. 11 and 12 in an developed form, and a negative mixture is supported by the negative substrate 80.

As the battery is a nickel hydrogen secondary battery, the negative mixture includes hydrogen absorbing alloy particles capable of absorbing and desorbing hydrogen as a negative active material, and a binder. The hydrogen absorbing alloy may be replaced with, for example, a cadmium compound to provide a nickel cadmium secondary battery. The negative active material is not particularly limited. It is to be noted however that a nickel hydrogen secondary battery is suitable for increasing the capacity of the battery. With the active material being hydrogen, because the capacity of the negative electrode is defined by the amount of the hydrogen absorbing alloy, the hydrogen absorbing alloy is also called "negative active material" in the invention.

The hydrogen absorbing alloy particles can be of any type as long as they can absorb hydrogen generated electrochemically in the alkaline electrolyte at the time of charging the battery and can easily desorb the absorbed hydrogen at the time of discharging. Available as such a hydrogen absorbing alloy is, for example, an $AB_5$-based alloy, such as $LaNi_5$ and $MmNi_5$ (where Mm is mesh metal), which is not particularly restrictive. Hydrophilic or hydrophobic polymer or the like can be used as the binder.

The negative substrate 80 is made of a metal sheet with a given thickness and through holes 82 are distributed all over the surface at predetermined locations. A punching metal, metal powder sintered substrate, an expanded metal and a nickel net or the like, for example, can be used as the material for the negative substrate 80. Particularly, a punching metal or a metal powder sintered substrate which has metal powders molded and then sintered is suitable for the negative substrate 80.

As the negative mixture is filled in the through holes 82 of the negative substrate 80 which is a sheet-like shape, the negative mixture is held in the form of a layer on both sides of the negative substrate 80. Hereinafter, the negative mixture filled in the through holes 82 is called a filler 84, the layer of the negative mixture which covers the inner surface of the negative substrate 80 and faces toward the center axis of the electrode assembly 22 is called "inner active material layer 86" or "inner layer 86" and the layer of the negative mixture which covers the outer surface of the negative substrate 80 and faces toward the radially outer periphery of the electrode assembly 22 is called "outer active material layer 88" or "outer layer 88".

Figure 13:
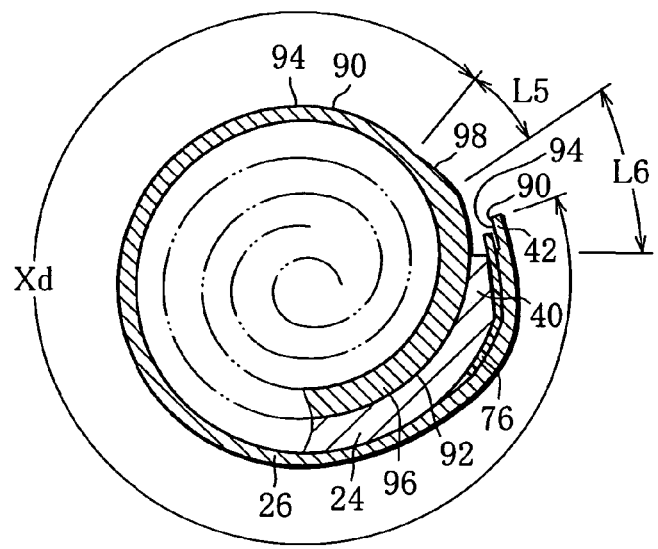
FIG. 13 is an exemplary diagram of the electrode assembly for explaining the positional relationship between the outer end portion of the positive plate and the outer end portion of the negative plate and the boundary portion of the negative plate in the circumferential direction of the electrode assembly.
Figure 14:
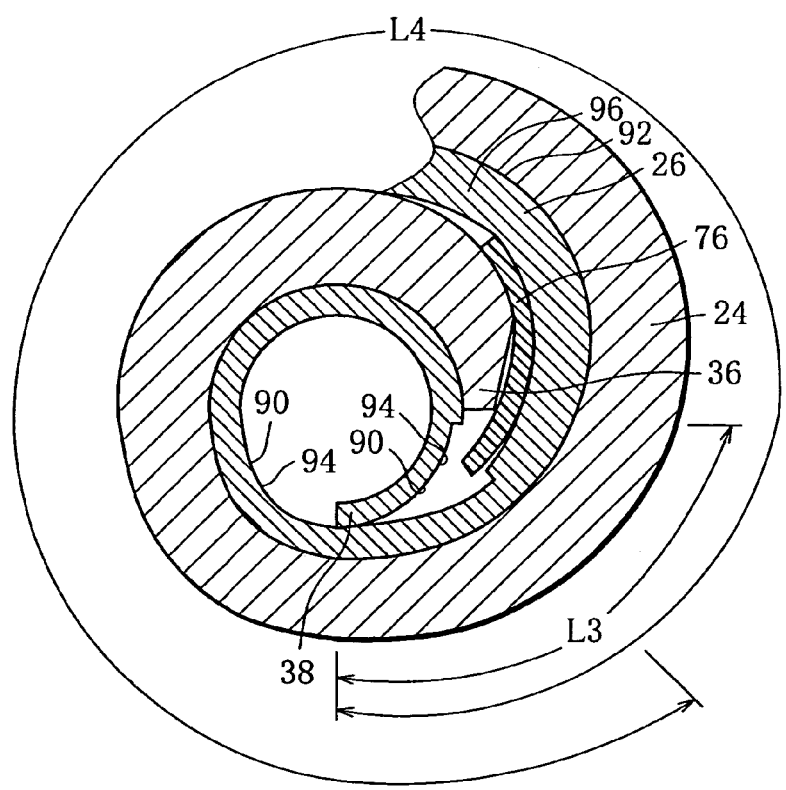
FIG. 14 is an exemplary diagram of the electrode assembly for explaining the positional relationship between the inner end portion of the positive plate and the inner end portion of the negative plate in the circumferential direction of the electrode assembly.

As exemplarily illustrated in FIGS. 13 and 14 with the separator 28 and negative substrate 80 omitted therefrom, the negative plate 26 has an area where the positive plate 24 is laid out on both sides via the separator 28, and also has an area where the positive plate 24 is not laid out via the separator 28 on those sides of the negative inner end portion 38 and the negative outer end portion 42. Referring also to FIG. 12, the inner layer 86 and the outer layer 88 have a non-overlapping portion 90 which does not overlap the positive plate 24 via the separator 28 adjoining to their own surfaces, and an overlapping portion 92 which overlaps the positive plate 24 via the separator 28 adjoining to their own surfaces. In this embodiment, nearly the entire non-overlapping portion 90 of the inner and outer layers 86 and 88 is formed thinner than the overlapping portion 92. Hereinafter, the thin section of the non-overlapping portion 90 is called "thin section 94".

More specifically, the outer layer 88 is formed thin over a length Xd from the negative outer end portion 42 on that side of the negative outer end portion 42 of the negative plate 26. The thin section 94 of the outer layer 88 is wound around the outermost portion of the electrode assembly 22 to contact the inner wall of the case 10. The inner layer 86 is formed thin over a length L2 from the negative outer end portion 42 in that area of the negative plate 26 which extends over the positive outer end portion 40 in the circumferential direction of the electrode assembly 22 on the radial outer surface side of the positive plate 24. The thin section 94 of the inner layer 86 overlaps the radially inward portion of the negative plate 26 via the separator 28. That is, the length L2 of the thin section 94 of the inner layer 86 is shorter than the length Xd of the thin section 94 of the outer layer 88 on that side of the negative outer end portion 42. On that side of the negative inner end portion 38, the thin section 94 is formed over a length L3 at the outer layer 88 in that area of the negative plate 26 which extends over the positive inner end portion 36 in the circumferential direction of the electrode assembly 22 on the radial inner surface side of the positive plate 24. The thin section 94 is formed over a length L4 at the inner layer 86 in that area of the negative plate 26 which extends over the positive inner end portion 36 in the circumferential direction of the electrode assembly 22 on the radial outer surface side of the positive plate 24. The thin section 94 of the outer layer 88 is positioned radially inward of the thin section 94 of the inner layer 86 via the separator 28, and the cavity 44 is present there. That is, the length L4 of the thin section 94 of the inner layer 86 is longer than the length L3 of the thin section 94 of the outer layer 88.

Figure 15:
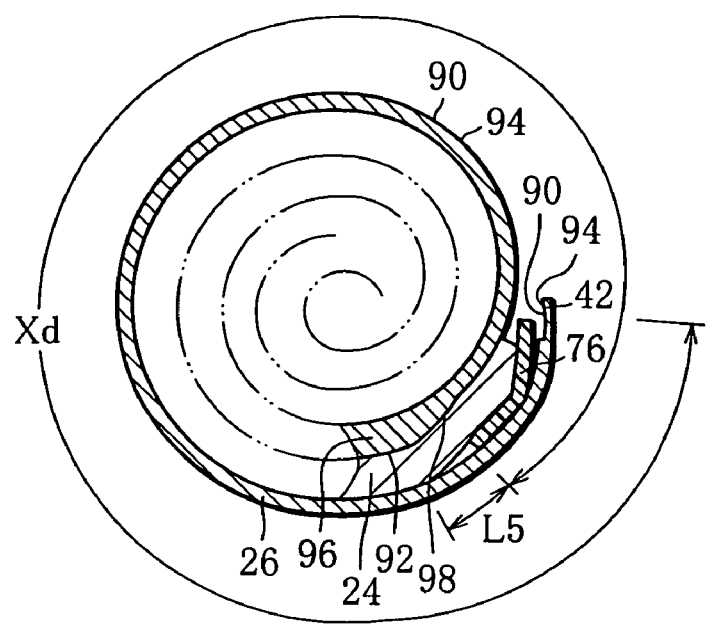
FIG. 15 is an exemplary diagram of the electrode assembly for explaining the positional relationship between the outer end portion of the positive plate and the outer end portion of the negative plate and the boundary portion of the negative plate in the circumferential direction of the electrode assembly.

Accordingly, the negative plate 26 has a negative main portion 96 with a given thickness between the negative inner end portion 38 and the negative outer end portion 42. Both lengthwise sides of the negative main portion 96, i.e., the negative inner end portion 38 and the negative outer end portion 42, are thinner than the negative main portion 96. In addition, as a preferable mode, between the negative main portion 96 and the thin negative outer end portion 42 with a given thickness, the negative plate 26 has a negative boundary portion 98 with a length L5 whose thickness changes in the lengthwise direction. The thickness of the outer layer 88 at the negative boundary portion 98 gradually decreases at a nearly constant change ratio toward the negative outer end portion 42 from the negative main portion 96, from a thickness T5 to a thickness T4. It is preferable that the negative boundary portion 98 should be positioned at a position different from the position of the positive outer end portion 40 in view of the circumferential direction of the electrode assembly 22. As exemplarily shown in FIG. 13, it is preferable that a length L6 by which the negative outer end portion 42 extends over the positive outer end portion 40 the circumferential direction of the electrode assembly 22 should be set within a range from 2 mm to 6 mm. However, the circumferential positions of the negative boundary portion 98 and the positive outer end portion 40 are not particularly restrictive, and the positive outer end portion 40 may extend over the negative boundary portion 98 the circumferential direction of the electrode assembly 22 as exemplarily shown in FIG. 15.

As a preferable mode, the volume of the negative plate 26 to the volume of the positive plate 24 is set equal to or less than 65%. The volume of the negative plate 26 is the volume of the negative plate 26 which is acquired from the thicknesses of the negative plate 26 at plural locations in the lengthwise direction of the negative plate 26 measured with a micrometer after the battery is disassembled to remove the negative plate 26 and the removed negative plate 26 is dried, and the length and width of the negative plate 26 measured with a ruler or the like.

As a preferable mode, the average thickness of the negative plate 26 is set in such a way that the thickness of the positive main portion 60 becomes equal to or greater than 2.5 times the thickness of the negative main portion 96. The average thickness of the negative plate 26, like the volume of the negative plate 26, is the average thickness of the negative plate 26 acquired by measuring the thickness of the negative plate 26 at plural locations in the lengthwise direction of the negative plate 26 with a micrometer after the battery is disassembled to remove the negative plate 26 and the removed negative plate 26 is dried.

The lengths Xd, L2, L3 and L4 and the thickness T4 of the thin section 94 on those sides of the negative inner end portion 38 and the negative outer end portion 42 may differ from one another. It is to be noted however that as a preferable mode, the lengths Xd, L2, L3 and L4 and the thickness T4 are set in such a way that the ratio of the opposing portion becomes 75% or higher and 100% or less. The ratio of the opposing portion, i.e., the ratio of the total amount of the hydrogen absorbing alloy (the amount of the negative active material) contained in the overlapping portion 92 of the inner and outer layers 86, 88 and in the filler 84 distributed in the area of the negative substrate 80 that is covered by the overlapping portion 92 on at least one side thereof to the amount of the negative active material contained in the entire negative plate 26.

It is preferable that the thickness T4 of the thin section 94 at the negative inner end portion 38 and the negative outer end portion 42 should be set equal to or less than half the thickness T5 of the overlapping portion 92. Alternatively, it is preferable that the amount of the hydrogen absorbing alloy contained per unit area of the thin section 94 should be set equal to or less than half the amount of the hydrogen absorbing alloy contained per unit area of the overlapping portion 92.

The thicknesses of the thin section 94 and the overlapping portion 92 at the inner and outer layers 86 and 88 are the thicknesses actually measured with a micrometer after the battery is disassembled to remove the negative plate 26 and the removed negative plate 26 is dried. Specifically, the thicknesses of the thin section 94 and the overlapping portion 92 at the inner and outer layers 86 and 88 are the thicknesses that are acquired from the difference between the measured thickness of the dried negative plate 26 and the thicknesses measured after the thin section 94 or the overlapping portion 92 is scraped off.

Figure 16:
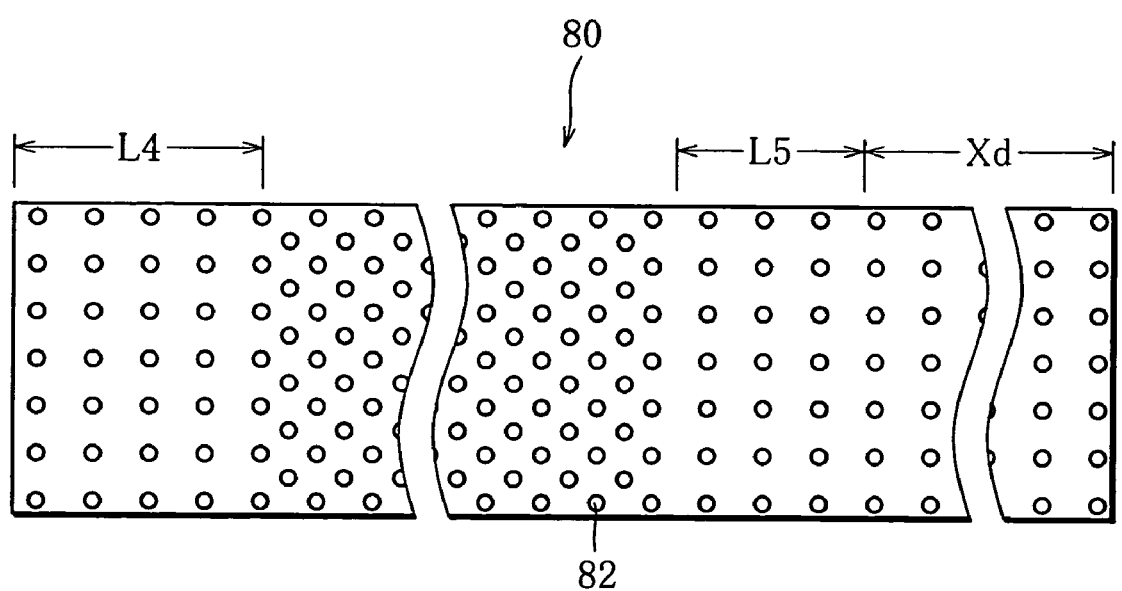
FIG. 16 is a plan view showing a negative substrate to be used in the negative plate in FIG. 3 in a developed state.
Figure 17:
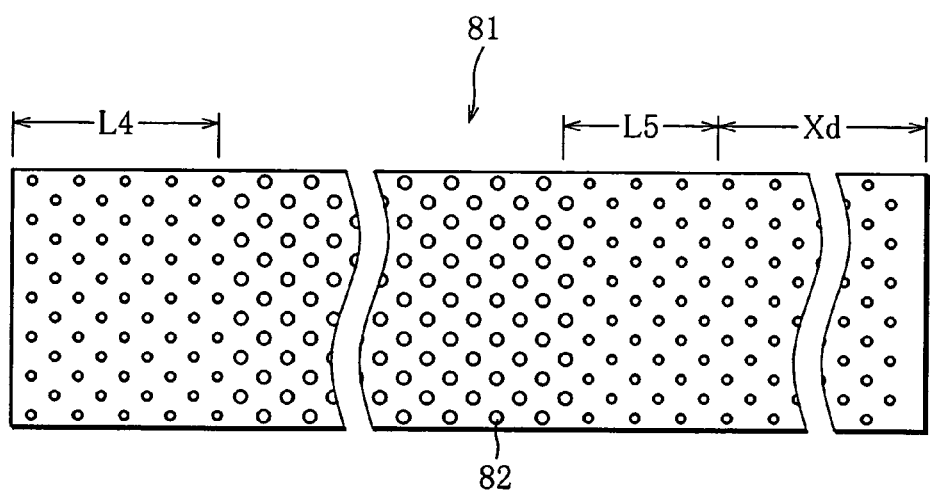
FIG. 17 is a plan view showing another negative substrate to be used in the negative plate in FIG. 3 in a developed state.

It is preferable that the numerical aperture of the through holes 82 should vary at the negative substrate 80 of the negative plate 26 according to the thicknesses of the inner and outer layers 86 and 88. Specifically, it is preferable that the numerical aperture of the through holes 82 should vary at the area that is covered with the overlapping portion 92, the area that is covered with the thin section 94 and the negative boundary portion 98 where the thickness of the outer layer 88 changes. It is more preferable that the numerical aperture is higher in the area covered with the overlapping portion 92 than in the area covered with the thin section 94 and the negative boundary portion 98. Specifically, a negative substrate where the number of the through holes 82 per unit area is changed as shown in FIG. 16 can be used as such a negative substrate 80. A negative substrate 81 where the diameter of the opening of each through hole 82 is changed as shown in FIG. 17 may be used as well.

A predetermined amount of alkaline electrolyte (not shown) is injected into the case 10 retaining the electrode assembly 22 and the charge/discharge reaction progresses between the positive plate 24 and the negative plate 26 via the alkaline electrolyte contained in the separator 28. As a preferable mode of the embodiment, the amount of injection of the alkaline electrolyte into the case 10 or the volume, Ve, of the alkaline electrolyte contained in the battery is set in such a way that the ratio of the volume of the alkaline electrolyte to the 0.2 C capacity of the batteryalkaline electrolyte, i.e., the capacity-electrolyte ratio, is equal to or smaller than 0.85 ml/Ah or less.

Though not particularly restrictive, the types of the alkaline electrolyte available are, for example, a sodium hydroxide solution, a lithium hydroxide solution, a potassium hydroxide solution, and a solution or the like in which two or more of the former three solutions are mixed. The concentration of the alkaline electrolyte is not particularly limited and, for example, an electrolyte with 8N can be used.

While the battery can be manufactured by using an ordinary method, one example for each of the fabrication method of the positive plate 24 and the negative plate 26 and a winding method for the electrode assembly will be discussed below.

In preparing the positive plate 24, first, a substrate made of nickel (hereinafter called "nickel substrate") as the positive substrate and a positive mixture paste are prepared. An ordinary nickel substrate is formed by calcining sponge urethane plated with nickel of a predetermined thickness by sequentially performing an electroless plating and electrolytic plating, and then reducing the resultant nickel plate. The nickel substrate whose amount of plating differs in the thicknesswise direction can be prepared by a method which is described in, for example, Japanese Patent Laid-Open Publication No. Sho 63-81767. Specifically, the nickel substrate can be prepared by changing the amount of the plating current at the time of electroplating on both sides of the sponge urethane. In preparing the positive mixture paste, the sizes of the positive active material particles and the additive particles should be adjusted properly so that the tap density of the mixed particles fall within a range from 2.1 g/cm$^3$ to 2.3 g/cm$^3$.

Next, the prepared nickel substrate is filled with the positive mixture paste and dried. Thereafter, the dried nickel substrate filled with the positive mixture paste is put through a gap between a pair of rolls, is compressed from both thicknesswise sides to thereby adjust the thickness, and is then cut to a predetermined size. As a preferable mode of the present embodiment, the dried nickel substrate filled with the positive mixture and having the adjusted thickness or the like is subjected to a leveling process to be discussed later. The nickel substrate undergone the leveling process is subjected to a tapering process which cuts away or presses those portions which become the positive inner end portion 36 and the positive outer end portion 40 to thereby form the inclined surface 66, thus providing the positive plate 24.

Figure 18:
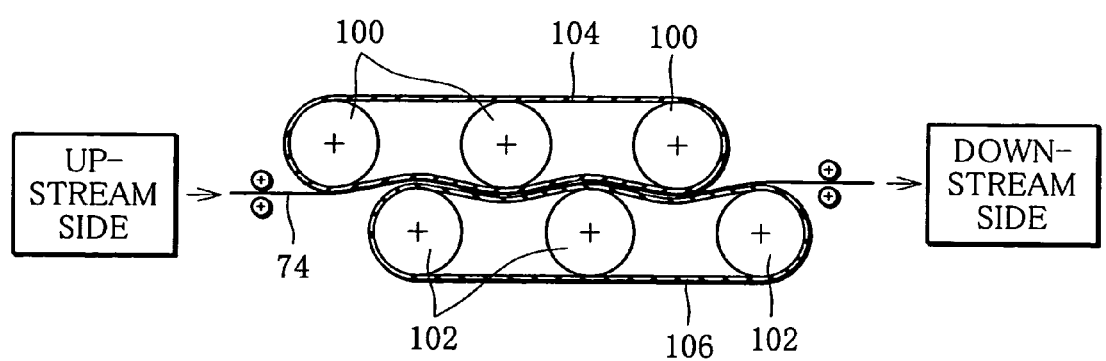
FIG. 18 is a schematic structural diagram of a leveling apparatus suitable for preparing the positive plate in FIG. 5.

The leveling process is carried out by an apparatus whose schematic structure is illustrated in FIG. 18. The leveling apparatus has a conveyance path along which a positive substrate (nickel substrate) 74 is conveyed in its own lengthwise direction and has three upper rolls 100 and three lower rolls 102 laid out on both sides of the conveyance path in such a way as to be orthogonal to the direction of conveyance. The positions of the upper rolls 100 and lower rolls 102 differ from one another as seen in direction of conveyance of the positive substrate 74. The distance between the centers of the upper and lower rolls 100 and 102 as seen in the thicknesswise direction of the positive substrate 74 is smaller than the outside diameter of the upper and lower rolls 100 and 102. Therefore, a part of the lower roll 102 sticks out between the upper rolls 100 and a part of the upper roll 100 sticks out between the lower rolls 102. Annular rubber belts 104 and 106 are respectively put around the upper rolls 100 and the lower rolls 102, and extend in the direction of conveyance of the positive substrate 74 while serpentining according to the amount of the protrusions of the upper and lower rolls 100 and 102. The positive substrate 74 is conveyed, held between those belts 104 and 106. During the conveyance, the positive substrate 74 is pressed from both thicknesswise sides by the upper and lower rolls 100 and 102 via the belts 104 and 106 and are alternately displaced in the thicknesswise direction according to the amount of the protrusions of the upper and lower rolls 100 and 102. After passing between the belts 104 and 106, the positive substrate 74 becomes flat again and is conveyed toward the downstream side.

In fabricating the negative plate 26, first, a punching metal to be the negative substrate 80 and the slurry of the negative mixture are prepared and the slurry is applied to the punching metal in such a way that the punching metal becomes thinner at the portion which will be the thin section 94, and is dried. Next, the punching metal holding the dried negative mixture is put through the gap between a pair of rolls and is compressed from both thicknesswise sides. At the time of rolling, the size of the gap is changed while keeping the pressing force of the rolls constant, thereby making the portion to be the thin section 94 thinner than the portion to be the overlapping portion 92. Then, the rolled metal is cut to a predetermined size, thereby providing the belt-like negative plate 26. The length L5 of the negative boundary portion 98 can be adjusted by controlling the thickness of the slurry to be applied or the pressing force of the rolls.

Figure 19:
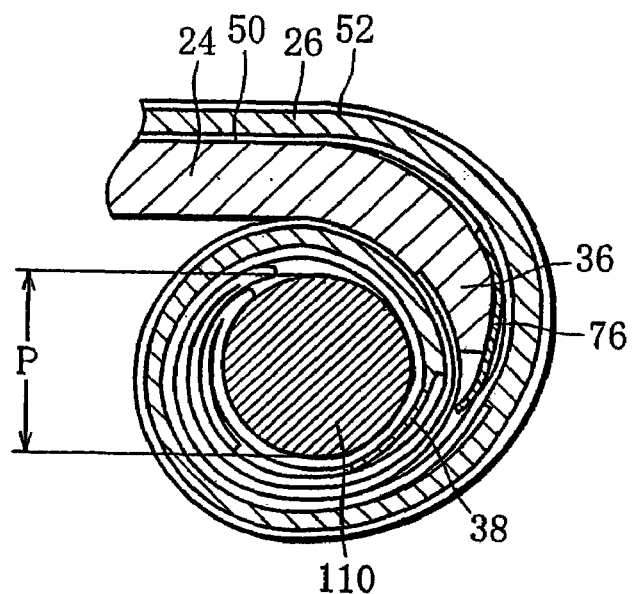
FIG. 19 is an explanatory diagram for a method of winding the electrode assembly to be used in the battery in FIG. 1.

The electrode assembly 22 are wound, as shown in FIG. 19, by continuously feeding the positive plate 24, the negative plate 26, the first separator 50 and the second separator 52 toward a cylindrical winding core 110 while rotating the winding core 110 in a constant direction. Though not particularly restrictive, the outside diameter, P, of the winding core 110 should preferably lie in a range from 0% to 30% of the outside diameter D (see FIG. 2) of the case 10.

In FIG. 19, as in FIG. 2, the hatching of the first and second separators 50 and 52 is omitted and the positive substrate 74 and the negative substrate 80 are not illustrated in order to avoid complication of lines.

According to the battery with the above-described structure, the outside diameter of the case 10 is set in a range from 13.5 mm to 14.5 mm, the ratio of the volume of the positive plate 24 to the characteristic volume of the case 10 is set in a range from 48% to 60%, and the battery has a high volume energy density in a range from 340 Wh/l to 450 Wh/l.

As the thickness of the positive plate 24 or the thickness T1 of the positive main portion 60 is set to 0.95 mm or greater as a preferable mode, the amount of the positive active material is increased efficiently without increasing the lengths of the separator 28 and the negative substrate 80. As a result, the battery achieves a volume energy density of 340 Wh/l or greater. When the thickness of the positive plate 24 exceeds 1.50 mm, the windability of the positive plate 24 drops and the positive plate 24 breaks at the time of winding the electrode assembly 22, thereby increasing the frequency of occurrence of short-circuiting. In this respect, it is preferable that the thickness of the positive plate 24 should be set equal to or smaller than 1.50 mm.

As a preferable mode of the embodiment, the filling density D of the positive mixture to the positive substrate in the positive plate 24 is set equal to or greater than 2.95 g/cm$^3$, so that while charging/discharging is repeated, the positive plate 24 hardly absorbs the alkaline electrolyte and is prevented from expanding. This secures the amount of the alkaline electrolyte that contributes the battery reaction, thus suppressing a reduction in battery life.

Further, as a preferable mode of the battery, the thickness of the positive plate 24 is set equal to or greater than 2.5 times the average thickness of the negative plate 26, so that the amount of the positive active material is increased efficiently. Accordingly, the battery achieves a high volume energy density in of 340 Wh/l or higher.

As a preferable mode of the battery, the thickness of the positive plate 24 is set equal to or greater than 9 times the average thickness of the separator 28, so that the amount of the positive active material is increased efficiently. As a result, the battery achieves a high volume energy density in of 340 Wh/l or higher. When the volume energy density exceeds 450 Wh/l, it is difficult to suppress a reduction in battery life. It is therefore preferable to set the volume energy density to 450 Wh/l or less.

As at least one of the positive inner end portion 36 and the positive outer end portion 40 is formed thinner than the positive main portion 60 as a preferable mode, the positive plate 24 and the negative plate 26 are wound in a nice spiral form as seen in a lateral cross section. Accordingly, the gap between those plates is constant over the entire lengthwise area, thus suppressing production of an oxygen gas originated from local termination of the charging reaction in the positive plate 24. As a result, the battery prevents the leakage of the alkaline electrolyte caused by the actuation of the relief valve, thus restraining a reduction in battery life. In addition, as the positive plate 24 is wound nicely in a spiral form, even if the positive main portion 60 has the thickness T1 of 0.95 mm or greater, the positive main portion 60 is hard to be broken at the time of winding. This prevents occurrence of short-circuiting. It is more preferable to form both the positive inner end portion 36 and the positive outer end portion 40 thin because the structure allows the positive plate 24 and the negative plate 26 to be wound in a spiral form more nicely than is permitted by the structure where only one of the positive inner end portion 36 and the positive outer end portion 40 is formed thin.

Because the positive plate 24 is subjected to a leveling process as a preferable mode of the battery, occurrence of short-circuiting is prevented more surely.

With the leveling process done (see FIG. 21), cracks are produced in the positive substrate 74 which is displaced in thicknesswise direction while traveling toward the downstream side from the upstream side of the conveyance path. The frame 70 which is broken at the cracked portions and becomes like spines protrudes toward the belts 104 and 106 from both sides of the positive substrate 74, so that the frame 70 is pressed from both thicknesswise sides of the positive substrate 74 by the belts 104 and 106. As the belts 104 and 106 are made of an elastic material like rubber, the belts 104 and 106 surely catch the protruding thorn-like frames 70 one after another to put them down along both sides of the positive plate 24 or push them into the sides thereof. As a result, both the sides of the positive substrate 74 become smooth regardless of the presence of cracks. When the electrode assembly 22 are wound using the positive plate 24 whose both sides are smoothed with the frame 70 partly broken, the broken frame 70 does not stick out from the radial inner surface and outer surface of the positive plate 24. As the frame 70 includes cracks, occurrence of new cracks in the frame 70 is prevented. The battery therefore prevents the thorn-like frame from sticking out from the radial inner surface and outer surface of the positive plate 24 and breaking through the separator 28, thus prohibiting short-circuiting.

At least one of the positive inner end portion 36 and the positive outer end portion 40 is formed thinner than the positive main portion 60 in the battery as a preferable mode. Even if the positive main portion 60 has the thickness T1 of 0.95 mm or greater and the negative inner end portion 38 and the negative outer end portion 42 extend over the positive inner end portion 36 and the positive outer end portion 40 on the radial outer surface side of the positive plate 24 in the circumferential direction of the electrode assembly 22, a reduction in the capacity of the negative electrode and an increase in inner resistance are prevented.

When the positive plate 24 is formed thin at the positive inner end portion 36, the positive plate 24 at the distal end of the positive inner end portion 36 becomes thin. Accordingly, the clearance defined by the positive inner end 62 and those portions of the separator 28 which extend over the positive inner end 62 frontward of the positive inner end 62 as seen in the circumferential direction of the electrode assembly 22 from both radial inner surface side and outer surface side of the positive plate 24 becomes smaller. Therefore, even if that portion of the negative plate 26 which is positioned outward of the clearance in the radial direction of the electrode assembly 22 via the separator 28 is bent toward the positive inner end 62 in such a way as to reduce the clearance, as indicated by an arrow 67 in FIG. 6, after the initial charging/discharging of the battery, the bending becomes small. This prevents the negative mixture from coming off from the negative substrate 80 at the bent portion of the negative plate 26, thereby preventing a reduction in the capacity of the negative electrode.

When the positive plate 24 is formed thin at the positive outer end portion 40, on the other hand, that portion of the negative plate 26 which is overlaid on the outer surface of the positive outer end portion 40 via the separator 28 is bent at the boundary between the positive main portion 60 and the positive outer end portion 40 rather than at the outer surface edge of the positive outer end portion 40. When the negative plate 26 is bent at the boundary of the positive plate 24 this way, bending of the negative plate 26 becomes smaller, as compared with a case where the negative plate 26 is bent at the outer surface edge of the positive outer end portion 40 without forming the positive outer end portion 40 thin. Further, the amount of the protrusion of the bent portion of the negative plate 26 outward in the radial direction of the electrode assembly 22 becomes small too, so that sliding of the bent portion of the negative plate 26 with the electrode winding machine and the case 10 is suppressed. This prevents the inner resistance from increasing which would otherwise be caused by the breaking of the negative substrate 80 of the battery at that portion of the negative plate 26 which is overlaid on the boundary of the positive plate 24 via the separator 28, or prevents the separation of the negative mixture from that portion which would otherwise reduce the capacity.

As the radial outer surfaces of the positive inner end portion 36 and the positive outer end portion 40 are formed as the inclined surfaces 66 so as to become narrower toward the distal ends, the inclination angle θ1 of the inclined surface 66 is set over 0° and equal to or smaller than 60°, and the ratio of the thickness T2 at the distal ends of the positive inner end portion 36 and the positive outer end portion 40 to the thickness T1 of the positive main portion 60 is set in a range from 10% to 70%, as shown exemplarily in FIG. 6, the internal angle θ2 of that portion of the negative plate 26 which is laid along the radial outer surface side of the positive plate 24 via the separator 28 and is bent at the edge 64 can be kept equal to or greater than 160°. As a result, it is possible to more reliably prevent the negative mixture from coming off from that portion of the negative plate 26, which would otherwise reduce the capacity.

In the battery, when the positive inner end portion 36 and the positive outer end portion 40 are formed thin, the positive inner end 62 and the outer end which rise vertically from the edges of the radial inner surface, so that the positive mixture is less likely to come off from the positive inner end portion 36 and the positive outer end portion 40 as compared with the case where the distal ends of the positive inner end portion 36 and the positive outer end portion 40 are made sharp. Therefore, the battery prevents the positive mixture from undesirably coming off from the positive inner end portion 36 and the positive outer end portion 40 when the positive plate 24 is handled in the process of assembling the battery, thereby preventing the battery capacity from falling. It is thus preferable that the ratio of the thickness T2 at the distal ends of the positive inner end portion 36 and the positive outer end portion 40 to the thickness T1 of the positive main portion 60 should be set within a range from 5% to 70%.

When the electrode assembly 22 are inserted into the case 10, large depressing force is applied to the boundary between the positive inner end portion 36 and the positive outer end portion 40, which are made thin, and the positive main portion 60, in the radial direction (thicknesswise direction). Because the protection member 76 is intervened between the boundary and the separator 28 positioned outward in the radial direction of the positive plate 24 in the battery, the burr at the edge 64 is prevented from breaking through the separator 28 and contacting the negative plate 26, which would otherwise result in short-circuiting. Although depressing force in the thicknesswise direction applied to that portion of the radial inner surface in the positive plate 24 which is opposite to the edge 64 is large when the electrode assembly 22 are inserted into the case 10, the portion of the radial inner surface is in level and flat, so that it does not break through the separator 28 to be short-circuited with the negative plate 26. In the battery, therefore, the contact between the positive plate 24 and the negative plate 26 is prevented on both radial sides of the positive plate 24 at the positive inner end portion 36 and the positive outer end portion 40, thereby preventing short-circuiting.

According to the battery, as the tap density of the mixed particles containing nickel hydroxide particles as a positive active material and additive particles is equal to or greater than 2.1 g/cm$^3$, the density of the positive active material is high and is suitable for increasing the capacity while the occurrence of short-circuiting and a reduction in overcharge characteristic are prevented.

To simplify the description, let us consider a case where two positive plates with the same capacity and the same volume are prepared and the tap densities of the mixed particles in the positive plates are made different from each other. In this case, the volume of the positive mixture to be filled in the positive substrate becomes larger for the positive plate that contains the mixed particles with a low tap density. When the tap density becomes lower, therefore, the ratio of the volume of the positive mixture occupying the pores in the positive substrate becomes larger, thus making the residual space in the positive substrate smaller. If the tap density is too low, therefore, when an oxygen gas is produced in the positive plate at the time of overcharging, the inner pressure of the battery rises immediately, actuating the relief valve to cause the alkaline electrolyte, together with the oxygen gas, to leak out of the battery. When the tap density is low, therefore, the mass of the battery decreases and the overcharge characteristic falls.

As a preferable mode of the battery, the tap density of the mixed particles is set equal to or higher than 2.1 g/cm$^3$ and the ratio of the volume of the positive mixture occupying the pores 72 in the positive substrate is limited in this mode. This secures the residual space in the positive substrate, so that the alkaline electrolyte is held in the residual space. Accordingly, the gas transmissivity in the separator is improved and an early rise of the inner pressure at the time of overcharging is prevented. This prevents leakage of the alkaline electrolyte caused by the actuation of the relief valve and a reduction in overcharge characteristic originated from the leakage in the battery.

Moreover, as a preferable mode of the battery, the tap density of the mixed particles is set equal to or lower than 2.3 g/cm$^3$, so that a reduction in high-rate charge characteristic is prevented.

When the tap density of the mixed particles becomes higher than 2.3 g/cm$^3$, a variation occurs in the distribution of the mixed particles in the positive mixture, i.e., the distribution of nickel hydroxide particles. In this case, at the time of high-rate charging, the charge reaction ends faster at that portion of the positive plate which contain fewer nickel hydroxide particles than at that portion of the positive plate which contain a larger number of nickel hydroxide particles, thereby producing an oxygen gas. While the oxygen gas is reduced in the negative plate, the reducing reaction raises the temperature of the battery.

In the battery, therefore, the tap density of the mixed particles is set equal to or lower than 2.3 g/cm$^3$ to suppress a variation in the distribution of the mixed particles in the positive mixture. Accordingly, the nickel hydroxide particles are distributed uniformly over the entire positive plate, thereby preventing local generation of an oxygen gas at the time of high-rate charging and a rise in the temperature of the battery originated from the reaction of reducing the oxygen gas.

As a preferable mode of the battery, the elements of the frame 70 of the positive substrate of the positive plate 24 is formed thicker on the radial inner surface side of the positive plate 24 than on the radial outer surface side thereof. This prevents a rise in the temperature of the battery which is originated from local generation of an oxygen gas and the reducing reaction at the time of high-rate charging.

In the electrode assembly 22, the gap between the radial inner surface side of the positive plate 24 and the radial outer surface side of the negative plate 26 is narrower than the gap between the outer surface side of the positive plate 24 and the inner surface side of the negative plate 26. Therefore, the battery reaction progresses faster on the inner surface side of the positive plate 24 than on the outer surface side. According to the battery, therefore, the elements of the frame 70 of the positive substrate are formed thicker on the inner surface side than on the outer surface side, thus increasing the conductivity on the inner surface side of the positive plate 24. This prevents the generation of heat on the inner surface side of the positive plate 24 at the time of high-rate charging, suppressing a rise in the temperature of the battery. It is preferable that the thickness of the elements of the frame 70 on the radial outer surface side should lie in a range of 0.4 to 0.8 times the thickness of the elements of the frame 70 on the radial inner surface side.

As a preferable mode of the battery, the ratio of the opposing portion is set in a range from 75% to 100%, thereby suppressing a reduction in battery characteristic, such as the battery life or the discharge characteristic.

The negative plate 26 has a portion where the positive plate 24 is placed only on one surface side via the separator 28 and a portion where the positive plate 24 is placed on neither surface side. Therefore, the inner layer 86 and outer layer 88 that cover the individual sides of the negative substrate 80 have an overlapping portion 92 which is laid over on the adjoining positive plate 24 via the separator 28 and a non-overlapping portion 90 which is not laid over on the positive plate 24. The non-overlapping portion 90 contributes to the battery reaction less than the overlapping portion 92. In the battery, therefore, the ratio of the opposing portion, which is approximately 70% in the battery according to the prior art, is set in a range from 75% to 100%, so that the amount of the negative active material contained in the non-overlapping portion 90 is limited, thereby securing the amount of the negative active material contained in the overlapping portion 92. In the battery, therefore, the battery reaction progresses uniformly over the entire positive plate 24 at the time of charging/discharging. This prevents early local degradation of the active material and leakage of the alkaline electrolyte which is caused by a rise in the inner pressure of the battery originated from the delayed reaction of reducing an oxygen gas, thereby suppressing shortening of the battery life.

As a preferable mode of the battery, the thin section 94 whose thickness is equal to or less than half the thickness of the overlapping portion 92 is formed at the non-overlapping portion 90 of at least the outer layer 88 placed at the outermost portion of the electrode assembly 22, thereby suppressing a reduction in battery life.

The non-overlapping portion 90 of the negative active material layer which forms the outermost portion of the electrode assembly 22 contributes to the battery reaction less than the overlapping portion 92. According to the battery, the thin section 94 is formed at least at the non-overlapping portion of 90 the outer layer 88 in the negative active material layer which is longer than the non-overlapping portion 90 of the inner layer 86 at the time of reducing the volume of the negative plate 26 placed at the outermost portion of the electrode assembly 22. This surely reduces the amount of the negative active material in the non-overlapping portion 90 while securing the amount of the negative active material in the overlapping portion 92. In the battery, therefore, the battery reaction progresses uniformly over the entire positive plate 24 at the time of charging/discharging. This prevents early local degradation of the active material and leakage of the alkaline electrolyte which is caused by a rise in the inner pressure of the battery originated from the delayed reaction of reducing an oxygen gas, thereby suppressing shortening of the battery life.

As a preferable mode of the battery, the thin section 94 is further formed at least at the non-overlapping portion 90 of the inner layer 86 which is included in the non-overlapping portion 90 of the negative active material layer on the negative inner end portion (38) side and which is longer than the non-overlapping portion 90 of the outer layer 88. This secures a larger amount of the negative active material contained in the overlapping portion 92, thereby suppressing a reduction in battery life more reliably.

As a preferable mode of the battery, while the thickness of the thin section 94 is set equal to or smaller than half the thickness of the overlapping portion 92, it is also preferable that the negative substrate 80 should not be exposed even at the non-overlapping portion 90 for the following reason. When the negative substrate 80 is exposed, i.e., when the thickness of the thin section 94 is set to 0 mm, the presence of the exposed portion delays the oxygen gas reducing reaction, which would lead to shortening of the battery life.

As a preferable mode of the battery, the negative boundary portion 98 and the positive outer end portion 40 are arranged at circumferential positions different from each other. This prevents occurrence of cracking or rupture at the negative boundary portion 98 and an increase in inner resistance or the occurrence of short-circuiting which is originated from such cracking or rupture.

While the negative boundary portion 98 has a low strength due to a change in the thickness of the outer layer 88, the electrode assembly 22 are pressed hardest against the inner wall of the case 10 in the direction that connects the positive outer end portion 40 to the center axis of the electrode assembly 22. When the positive outer end portion 40 overlaps the negative boundary portion 98 via the separator 28, therefore, the negative boundary portion 98 is pressed by the positive outer end portion 40, which may cause cracking or rapture in the negative boundary portion 98. In the battery, therefore, the negative boundary portion 98 with a low strength is laid at a circumferential position different from that of the positive outer end portion 40, thereby preventing occurrence of cracking or rupture at the negative boundary portion 98 and an increase in inner resistance or the occurrence of short-circuiting which is originated from such cracking or rupture. In this case, if the negative boundary portion 98 is located inward of the positive outer end portion 40 as seen in the circumferential direction of the electrode assembly 22, the positive plate 24 is laid over the thin section 94 adjoining the negative boundary portion 98 via the separator 28 (see FIG. 15). The extension of the negative boundary portion 98 over the positive outer end portion 40 in the circumferential direction of the electrode assembly 22 by the length L6 ranging from 2 mm to 6 mm (see FIG. 13) is preferable to the layout in FIG. 15 due to the following reasons. When the length L6 is less than 2 mm, the positive outer end portion 40 may overlap the negative boundary portion 98 via the separator 28 due to a possible error in winding. When the length L6 is greater than 6 mm, multiple non-overlapping portions 90 would be present at the outer layer 88 of the negative main portion 96.

As a preferable mode of the battery, the numerical aperture of the through holes 82 in the negative substrate 80 is changed in such a way that the negative substrate 80 is reinforced at the thin portion of the negative plate 26. That is, the numerical aperture of the through holes 82 is changed according to the thicknesses of the inner layer 86 and the outer layer 88. This prevents the negative substrate 80 in the battery from being cracked or ruptured at the thin portion of the negative plate 26 at the time of winding. This results in prevention of an increase in inner resistance originated from cracking or rupture of the negative substrate 80 and heat generation based on the increased resistance at the time of charging/discharging. The structure also prevents short-circuiting from occurring as a result of the cracked or ruptured portion breaking through the separator 28 and contacting the positive plate 24.

As a preferable mode of the battery, as the volume of the negative plate 26 is set equal to or less than 65% of the volume of the positive plate 24, the amount of the positive active material is efficiently increased, thereby achieving a volume energy density of 340 Wh/l or higher.

As a preferable mode of the battery, the capacity-electrolyte ratio is set to 0.85 ml/Ah or less, thus suppressing deterioration of the electrolyte leakage preventing property.

In a battery having a volume energy density of 340 Wh/l or greater, as the volumes of the negative plate, the separator and the alkaline electrolyte decrease and the excess space in the battery excluding those volumes and the volume of the positive plate decreases as well. When the alkaline electrolyte is injected into the reduced excess space in order to guarantee the battery life, the space where the oxygen gas produced in the positive plate is temporarily stored is gone. When the oxygen gas is produced in the positive plate at the time of charging, therefore, the inner pressure rises immediately and the relief valve is actuated, leaking alkaline electrolyte out. According to the battery, therefore, the capacity-electrolyte ratio is set to 0.85 ml/Ah or less to secure the excess space, thereby preventing leakage of the alkaline electrolyte caused by the actuation of the relief valve.

As a preferable mode of the battery, the electrode assembly 22 are wound by using the winding core 110 having the outside diameter P which is 30% or smaller than the outside diameter D of the case 10 to thereby prevent leakage of the alkaline electrolyte caused by the actuation of the relief valve.

When the ratio of the inside diameter of the cavity 44 of the electrode assembly 22 exceeds 30% of the outside diameter D of the case 10, the oxygen gas produced in the positive plate 24 is likely to remain in the cavity 44 at the time of charging, delaying the reducing reaction in the negative plate 26. According to the battery, therefore, while the inside diameter of the cavity 44 of the electrode assembly 22 is made smaller by winding the electrode assembly 22 using the winding core 110 the ratio of whose outside diameter P to the outside diameter D of the case 10 is 30% or less, and the space for temporary storage of the oxygen gas, which corresponds to the amount of the reduction of the cavity 44, is dispersed inside the battery. This prevents delay of the reaction of reducing the oxygen gas, thereby preventing the actuation of the relief valve caused by a rise in inner pressure.

Because the ratio of the cross-sectional area of the electrode assembly 22 is set equal to or greater than 90% in the battery, an increase in inner resistance is further prevented.

When the ratio of the cross-sectional area of the electrode assembly 22 is low, the compressing force applied to the electrode assembly 22 by the inner wall of the case 10 from both radial sides becomes smaller, so that the degree of constriction of the electrode assembly 22 becomes lower. When the positive lead 30 whose end portion is welded to one side of the positive plate 24 and the lid plate 14 is placed in the opening edge of the case with the a low degree of constriction, a large load is applied to the welded place of the positive plate 24 where the end portion of the positive lead 30 is welded. Then, the positive plate 24 breaks at the welded place, resulting in an increased inner resistance. In this respect, the ratio of the cross-sectional area of the electrode assembly 22 in the battery is set equal to or greater than 90% to increase the compressing force applied to the electrode assembly 22, thereby making the degree of constriction of the electrode assembly 22 larger. This allows the welded place of the positive plate 24 to be held pressed by the negative plate 26 from both radial sides via the separator 28. This prevents deformation of the positive plate 24 at the welded place at the time the positive lead 30 is bent. As a result, breaking of the positive plate 24 in the battery at the welded place is prevented, thereby preventing an increase in inner resistance.

The invention is not limited to the embodiment but can be modified in various forms. For example, the valve element of the relief valve may be changed to a disc which is urged by a compression spring.

While it is preferable that the positive plate 24 should be tapered at both the positive inner end portion 36 and the positive outer end portion 40, the tapering may be done at one of the end portions. Alternatively, the thickness of the positive plate 24 may be uniform in the lengthwise direction including the positive inner end portion 36 and the positive outer end portion 40.

Figure 20:
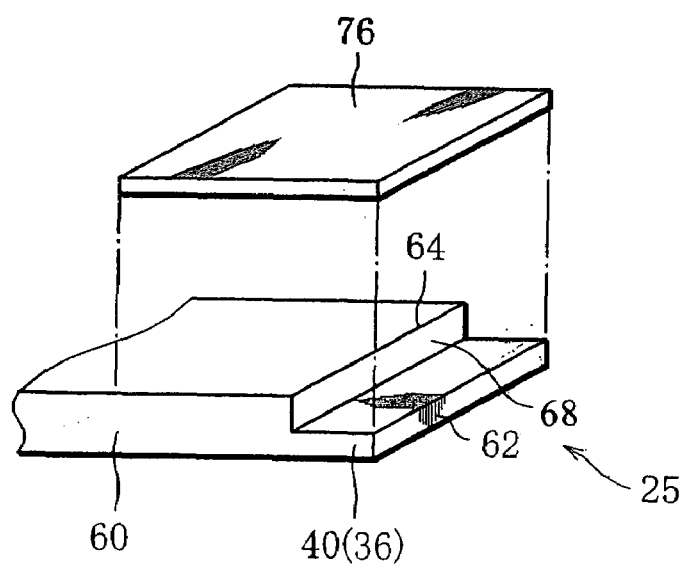
FIG. 20 is a perspective view showing a part of another positive plate to be used in the battery in FIG. 1, together with a protection member, in a developed state.
Figure 21:
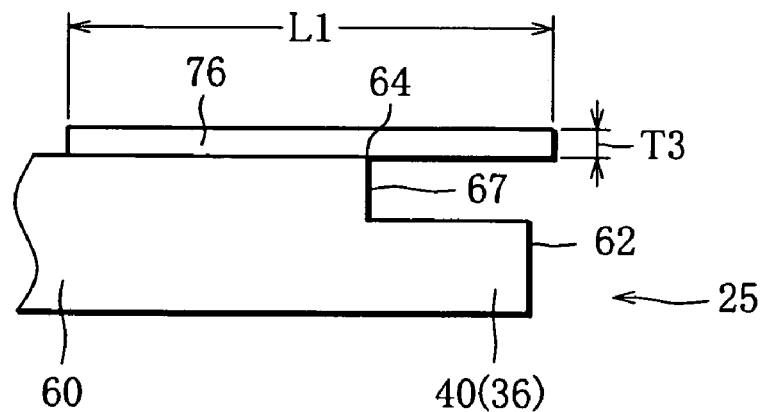
FIG. 21 is a side view showing the positive plate and the protection member in FIG. 20 overlapping each other.

A positive plate 25 as shown in FIGS. 20 and 21 may be used instead of the positive plate 24. The positive plate 25 has a step 68 formed at the boundary between the positive main portion 60 and the positive inner end portion 36 and the positive outer end portion 40 on the radial outer surface side. The positive inner end portion 36 and the positive outer end portion 40 are formed with uniform thicknesses thinner than the positive main portion 60, and the radial inner surface of the positive plate 24 is in level across the boundary.

Figure 22:
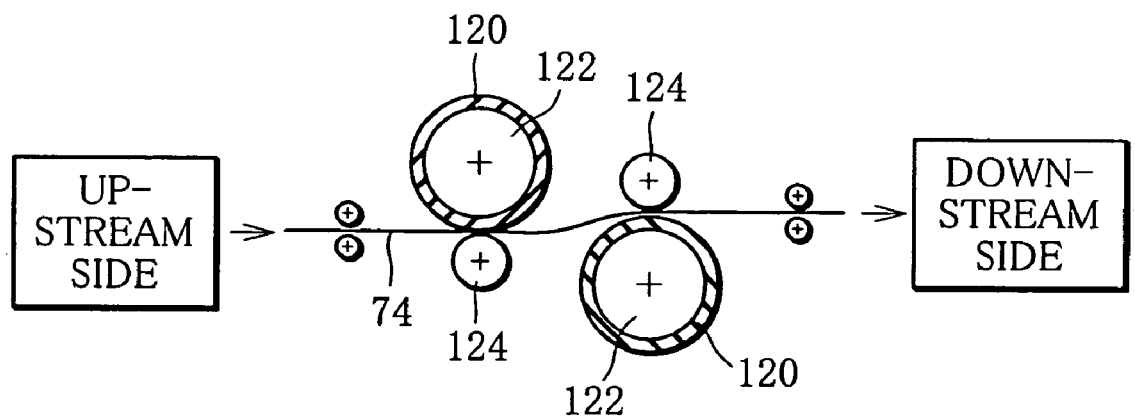
FIG. 22 is a schematic structural diagram of another leveling apparatus suitable for preparing the positive plate in FIG. 5.

The leveling method and apparatus for the positive plate 24 are not particularly limited. An apparatus as shown in FIG. 22 may be used in place of the one shown in FIG. 18. In the apparatus in FIG. 22, a large roll 122 whose outer surface is covered with a rubber cover 120 is laid out on either side of the conveyance path of the positive substrate 74. The large rolls 122, 122 are laid out at different locations in the direction of conveyance. The large rolls 122, 122 hold the conveyance path from both sides in cooperation with guide rolls 124 placed with a predetermined gap therebetween. The position of the gap differs between the large roll 122 located upstream in the moving direction and the large roll 122 located downstream, as seen in the thicknesswise direction of the positive substrate 74 to be conveyed. Thicknesswise directional displacement is applied to the positive substrate 74 from both thicknesswise sides by the large rolls 122 via the cover 120 in accordance with the difference between the thicknesswise directional positions of the gap. The positive substrate 74 applied with the displacement becomes flat again and is conveyed toward the downstream.

EXAMPLES 1 TO 5 AND COMPARATIVE EXAMPLE 1

1. Preparation of Positive Plate

First, the positive active material was prepared as follows.

A nickel hydroxide powder in which 2.5 wt % of zinc and 1 wt % of cobalt were dissolved was added to one liter of solution of 13.1 g of cobalt nitrate. 1 M of a sodium hydroxide solution was gradually dropped into the solution while being stirred and pH was held at 11 during reaction. As a result, with nickel hydroxide particles as the nucleus, a particulate matter having a coat layer of cobalt hydroxide formed on the surface was prepared. The particulate matter was cleaned and dried. A sodium hydroxide solution of 25 wt %, ten times as much as the amount of the dried particulate matter in weight ratio, was added to and impregnated into the dried particulate matter in a beaker while being stirred, and was subjected to a heat treatment (alkaline heat treatment) at 85° C. in the air for eight hours while being stirred. The alkaline heat treatment caused the cobalt hydroxide in the coat layer to contain sodium and partly get oxidized to be higher-order oxide. Then, the particulate matter undergone the alkaline heat treatment was washed with water, dehydrated, and then dried at 65° C. As a result, with nickel hydroxide particles as the nucleus, complex particles whose surfaces were covered with a coat layer of cobalt hydroxide containing 1 wt % of sodium and partly oxidized were prepared as an active material.

Next, 3 parts by weight of an additive and 50 wt parts of a solution containing 0.2 wt % of methyl cellulose as a binder were added to and mixed with 97 parts by weight of the obtained positive active material powder, yielding a positive mixture slurry. The sizes of the positive active material particles and the additive particles were changed to adjust the tap density of the mixed particles consisting of the positive active material particles and the additive particles in each of examples and a comparative example.

In Examples 1 to 4, the positive mixture slurry was filled in a nickel substrate with a porosity of 95% and frame elements whose thicknesses were different on both thicknesswise sides and dried, after which the nickel substrate was rolled. The rolled nickel substrate was cut to a predetermined size and subjected to a leveling process, after which the positive inner end portion 36 and the positive outer end portion 40 were chipped to form the inclined surfaces 66, yielding the positive plate 24 as shown in FIG. 5.

In Comparative Example 1, the positive mixture slurry was filled in a nickel substrate with a porosity of 95% and frame elements having the same thickness on both thicknesswise sides and dried, after which the nickel substrate was rolled. The rolled nickel substrate was cut to a predetermined size, yielding the positive plate with a uniform thickness.

The use of the nickel substrate having different thicknesses before filling the positive mixture slurry and changing the thickness of the positive plate after rolling adjusted the capacity of the positive plate and the filling density D of the positive mixture to the positive substrate in each of the examples and the comparative example.

2. Preparation of Negative Plate

First, source metals commercially available were weighed and mixed so as to provide $Mm_{1.0}Ni_{3.7}Co_{0.8}Al_{0.3}Mn_{0.2}$. The mixture was dissolved in a high-frequency fusion furnace and the melt was poured into molds to prepare a hydrogen absorbing alloy ingot. The ingot was roughly pulverized beforehand and then mechanically pulverized in the atmosphere of an inert gas until the average particle size became approximately 50 μm.

Next, polyethylene oxide or the like as a binder and the adequate amount of water were added to and mixed with the obtained hydrogen absorbing alloy powder, yielding a negative mixture slurry. The negative mixture slurry was applied to both sides of a negative substrate made of a punching metal and was dried. Then, the dried punching metal was rolled at a given pressure and was cut to a predetermined size, yielding a negative plate.

In Examples 1 and 2, with the negative mixture slurry applied thin, most of the portion in the outer layer 88 of the negative outer end portion 42 which was to be the non-overlapping portion 90 was formed as the thin section 94. In Examples 3 to 5, most of the portions of the inner layer 86 and the outer layer 88 of the negative inner end portion 38 and the negative outer end portion 42, which were to be the non-overlapping portions 90, were formed as the thin sections 94. In Comparative Example 1, a negative plate 26 with a uniform thickness from the negative inner end portion 38 to the negative outer end portion 42 was prepared.

Used as the negative substrate 80 in Examples 1 to 5 was such a punching metal that the number of the through holes 82 per unit volume in the area where the thin section 94 and the negative boundary portion 98 were to be formed was 0.5 times the number of the open areas of the through holes 82 per unit volume in the area where the negative main portion 96 was to be formed. In Comparative Example 1, a punching metal such that the number of the through holes 82 per unit volume was constant over the entire surface was used.

3. Assembly of Battery

Electrodes were prepared by spirally winding the acquired positive plate and negative plate via the first and second separators of a polyolefin-based nonwoven fabric. The electrode assembly were inserted in an AA-size case having the outside diameter D given in Table 1. Then, 8N of KOH solution containing LiOH and NaOH was poured into the case in such a way to achieve the capacity-electrolyte ratio given in Table 2, yielding hundred nickel hydrogen secondary batteries of AA size having the relief valve constructed as shown in FIG. 1 for each of the examples and comparative example. Table 1 and Table 2 show the ratio of the volume of the positive plate to the characteristic volume of the case, the thickness of the positive plate, the ratio of the thickness of the frame elements on the radial outer surface side of the nickel substrate as the positive substrate to the thickness of the frame elements on the radial inner surface side, the ratio of the thickness of the positive plate to the average thickness of the negative plate, the ratio of the thickness of the positive plate to the average thickness of the separator, and the ratio of the volume of the negative plate to the average volume of the positive plate.

4. Evaluation Test for Battery (1) Measurement of 0.2 C Capacity

As defined in JIS C8708-1997, measurements were taken on the capacity (0.2 C capacity) when the battery of each of Examples 1 to 5 and Comparative Example 1 was charged for sixteen hours with a current whose flow rate was equivalent to 0.1 C, was then stopped for one to four hours, was then discharged to the discharge end voltage of 1.0 V with a current whose flow rate was equivalent to 0.2 C at the ambient temperature of 20±5° C. Then, the 0.2 C capacity was multiplied by 1.2 V as the operation voltage and the resultant value was then divided by the volume of the battery to acquire the volume energy density. The results are given in Table 1 as the average value for hundred batteries.

(2) Evaluation of Battery Life

The batteries of Examples 1 to 5 and Comparative Example 1 were initially charged and discharged. Then each battery was measured by weight and subjected to 200 cycles of charging/discharging in each of which the battery was charged to −ΔV with the current with a flow rate equivalent to 1 C, rested for one hour and then discharged with the current with a flow rate equivalent to 1 C until the battery voltage reached 1.0 V. After the discharging in the 200th cycle, each battery was measured by weight to acquire the amount of the battery mass (electrolyte) reduced in 200 cycles. The obtained amount of reduction for each of the examples and comparative example was taken as a reciprocal number which is shown in Table 2 with the reciprocal of the amount of reduction for Comparative Example 11 taken as 100 as an index. The amount of reduction is the average value for hundred batteries.

TABLE 1

|  | 0.2 C capacity (mAh) | Volume energy density (Wh/l) | Case outside diameter D (mm) | Ratio of volume of positive plate to characteristic volume of case (%) | Filling density D (g/cm³) | Thickness of positive plate (mm) |
|---|---|---|---|---|---|---|
| Comparative Example 1 | 2100 | 330 | 13.95 | 50.1 | 2.88 | 1.03 |
| Example 1 | 2300 | 360 | 13.95 | 51.2 | 3.08 | 1.07 |
| Example 2 | 2500 | 388 | 14.00 | 52.1 | 3.19 | 1.10 |

TABLE 1-continued

|  | 0.2 C capacity (mAh) | Volume energy density (Wh/l) | Case outside diameter D (mm) | Ratio of volume of positive plate to characteristic volume of case (%) | Filling density D (g/cm$^3$) | Thickness of positive plate (mm) |
| --- | --- | --- | --- | --- | --- | --- |
| Example 3 | 2700 | 420 | 14.00 | 53.3 | 3.24 | 1.13 |
| Example 4 | 2900 | 432 | 14.30 | 54.1 | 3.28 | 1.20 |
| Example 5 | 3000 | 447 | 14.30 | 54.0 | 3.38 | 1.20 |

TABLE 2

|  | Ratio of thickness of frame elements (outer surface side/inner surface side) | Capacity-electrolyte ratio (ml/Ah) | Thickness ratio Positive plate/ negative plate | Thickness ratio Positive plate/ separator | Volume ratio (%) Positive plate/ negative plate | Battery life |
| --- | --- | --- | --- | --- | --- | --- |
| Comparative Example 1 | 1.0 | 0.88 | 2.4 | 10.0 | 65.6 | 100 |
| Example 1 | 0.6 | 0.78 | 2.6 | 11.4 | 63.1 | 100 |
| Example 2 | 0.6 | 0.73 | 2.7 | 11.7 | 59.4 | 95 |
| Example 3 | 0.5 | 0.68 | 2.8 | 12.7 | 58.0 | 90 |
| Example 4 | 0.5 | 0.65 | 2.8 | 13.4 | 57.6 | 80 |
| Example 5 | 0.5 | 0.62 | 2.8 | 13.5 | 57.4 | 75 |

As apparent from Table 1 and Table 2, Comparative Example 1 has a volume energy density of 330 Wh/l, whereas Examples 1 to 5 have apparently higher volume energy densities ranging from 360 Wh/l to 447 Wh/l. Example 1 and Comparative Example 1 have similar battery lives, and even Example 5 which shows the highest volume energy density shows a reduction in battery life of approximately 25. It is apparent that a reduction in battery life can be suppressed.

What is claimed is:

1. A cylindrical alkaline storage battery comprising:
a cylindrical case having a conductivity and an outside diameter within a range from 13.5 mm to 14.5 mm; and
an electrode assembly contained in said case together with an alkaline electrolyte, said electrode assembly including a negative plate and positive plate being spirally wound with a separator intervened therebetween, said negative plate forming an outermost portion of said electrode assembly and being in contact with an inner wall of said case, wherein
a volume energy density of said battery ranges from 340 Wh/l to 450 Wh/l, and
a ratio of a volume of said positive plate to a characteristic volume of said case ranges from 48% to 60%.

2. The battery according to claim 1, wherein said positive plate includes a metal substrate having a three-dimensional mesh frame and a positive mixture filled in the substrate, and has a thickness of 0.95 mm or greater.

3. The battery according to claim 1, wherein said positive plate includes a metal substrate having a three-dimensional mesh frame, and
a positive mixture filled in said substrate at a filling density of 2.95 g/cm$^3$ or higher.

4. The battery according to claim 1, wherein said positive plate has a thickness equal to or greater than 2.5 times an average thickness of said negative plate.

5. The battery according to claim 1, wherein said positive plate has a thickness equal to or greater than 9 times an average thickness of said separator.

6. The battery according to claim 2, wherein said positive plate has an inner end portion and an outer end portion respectively corresponding to a beginning of winding of said electrode assembly and an end of winding thereof, and a main portion extending between the inner end portion and the outer end portion and having a constant thickness, and
at least one of the inner end portion and the outer end portion is thinner than the main portion.

7. The battery according to claim 6, wherein the outer end portion of said positive plate is thinner than the main portion,
said positive plate includes an inner surface and an outer surface in view of a radial direction of said electrode assembly, the inner surface having a flat boundary area between the main portion and outer end portion, and
said battery further comprises an insulating protection member located between the outer surface of said positive plate and said separator, the insulating protection member covering the boundary area.

8. The battery according to claim 2, wherein the positive mixture of said positive plate includes mixed particles containing nickel hydroxide particles as a positive active material and additive particles, the mixed particles having a tap density within a range from 2.1 g/cm$^3$ to 2.3 g/cm$^3$, and a binder for binding the mixed particles.

9. The battery according to claim 2, wherein the frame of said substrate includes frame elements located on an inner surface side of said positive plate are thicker than that located on an outer surface side of said positive plate.

10. The battery according to claim 1, wherein said negative plate includes:
a negative substrate made of a metal conductive sheet and having a plurality of through holes, an inner surface and an outer surface in view of a radial direction of the electrode assembly; and
a negative active material layer deposited on the negative substrate and including
an inner layer which covers the inner surface of said negative substrate and has an overlapping portion overlapping said positive plate adjacent thereto via said separator,
an outer layer which covers the outer surface of said negative substrate and has an overlapping portion overlapping said positive plate adjacent thereto via said separator, and a filler filled in the through holes of the negative substrate, the filler having filling portions distributed in an area of the negative substrate that is covered by the overlapping portion of the inner layer and the outer layer on at least one side thereof; and wherein a total amount of the negative active material contained in the overlapping portions of the inner layer and the outer layer and the filling portions of the filler ranges from 75% of an amount of said negative active material contained in the entire negative plate to 100%.

11. The battery according to claim 1, wherein said negative plate includes:

a negative substrate made of a metal conductive sheet and having a plurality of through holes, an inner surface and an outer surface in view of a radial direction of said electrode assembly; and a negative active material layer deposited on the negative substrate and including an inner layer that covers the inner surface of said negative substrate and has an overlapping portion overlapping said positive plate adjacent thereto via said separator, and a non-overlapping portion which does not overlap said positive plate, an outer layer that covers the outer surface of said negative substrate and has an overlapping portion overlapping said positive plate adjacent thereto via said separator and a non-overlapping portion which does not overlap said positive plate, and a filler filled in the through holes of said negative plate; and wherein at least the non-overlapping portion of the outer layer in the negative active material layer of said negative plate forming the outermost portion of said electrode assembly has a thin section having a thickness equal to or less than a half of a thickness of the overlapping portion.

12. The battery according to claim 11, wherein each of said negative plate and said positive plate has an inner end portion and an outer end portion corresponding to a beginning of winding of said electrode assembly and an end of winding thereof, respectively, the inner end portion of said negative plate extending over the inner end portion of said positive plate from outside of said positive plate in view of a radial direction of said electrode assembly, and wherein at least the non-overlapping portion of the inner layer in the negative active material layer of the inner end portion of said negative plate has a thin section with a reduced thickness.

13. The battery according to claim 11, wherein an area covered with the overlapping portions of the inner layer and outer layer and an area covered with the thin section differ in a numerical aperture of the through holes in the negative substrate.

14. The battery according to claim 12, wherein an area covered with said overlapping portions of the inner layer and outer layer and an area covered with the thin section differ in a numerical aperture of the through holes in the negative substrate.

15. The battery according to claim 1, wherein a volume of said negative plate is set equal to or less than 65% of a volume of said positive plate.

16. The battery according to claim 1, wherein a capacity-electrolyte ratio of a volume of said alkaline electrolyte to a 0.2 C capacity is 0.85 ml/Ah or less.

17. The battery according to claim 1, wherein said electrode assembly s have a cavity in a center, the cavity having an inside diameter of 30% or less than the outside diameter of said case.

18. The battery according to claim 1, wherein said case has an open end and a lid plate fixed to the open end; and said battery further includes a positive lead laid out between said electrode assembly and said lid plate, the positive lead having an end portion welded to one side of said positive plate and a bent portion bent between said electrode assembly and said lid plate, wherein a percentage of a value obtained by dividing a first value by a second value ranges from 90% to 100%, the first value being obtained by subtracting a cross-sectional area of the cavity subtracted from a cross-sectional area of said electrode assembly, the second value being obtained by subtracting the cross-sectional area of the cavity from a cross-sectional area of an inner space of said case.

* * * * *